United States Patent
Parker

(10) Patent No.: US 9,403,469 B2
(45) Date of Patent: Aug. 2, 2016

(54) LIFT FOR ATTACHMENT TO VEHICLES

(71) Applicant: Peter M. Parker, Baraboo, WI (US)

(72) Inventor: Peter M. Parker, Baraboo, WI (US)

(*) Notice: Subject to any disclaimer, the term of this patent is extended or adjusted under 35 U.S.C. 154(b) by 112 days.

(21) Appl. No.: 14/097,944

(22) Filed: Dec. 5, 2013

(65) Prior Publication Data

US 2014/0161575 A1 Jun. 12, 2014

Related U.S. Application Data

(60) Provisional application No. 61/958,731, filed on Aug. 5, 2013, provisional application No. 61/855,187, filed on May 10, 2013, provisional application No. 61/797,393, filed on Dec. 6, 2012.

(51) Int. Cl.
*B60P 1/44* (2006.01)

(52) U.S. Cl.
CPC .................. *B60P 1/4414* (2013.01)

(58) Field of Classification Search
CPC ................ B60P 1/44; B60P 1/4414
USPC .................................. 414/546, 547
See application file for complete search history.

(56) References Cited

U.S. PATENT DOCUMENTS

| | | | | |
|---|---|---|---|---|
| 2,456,805 A * | 12/1948 | Wohlforth | ............ | B60P 1/4414 414/545 |
| 2,525,424 A * | 10/1950 | Novotney | ............ | B60P 1/4414 414/557 |
| 2,654,491 A * | 10/1953 | Duis | ............ | B60P 1/4414 414/557 |
| 2,725,152 A * | 11/1955 | Gwinn, Jr. | ............ | B60P 1/4414 296/61 |
| 3,057,491 A * | 10/1962 | Schlensker | ............ | B60P 1/4414 414/557 |
| 3,474,921 A * | 10/1969 | Rossoni | ................ | B60P 1/4414 280/400 |
| 5,277,275 A * | 1/1994 | Ablabutyan | .......... | B60P 1/4414 187/272 |
| 5,401,047 A | 3/1995 | Dettling, Jr. | | |
| 5,641,262 A * | 6/1997 | Dunlop | ................ | B60P 1/4414 254/10 R |
| 5,941,677 A * | 8/1999 | De Boer | ................ | B60P 1/4414 414/557 |
| 6,164,895 A * | 12/2000 | Croswell | ............... | B60P 1/4485 414/462 |
| 6,183,187 B1 * | 2/2001 | Ablabutyan | ............. | B60D 1/02 187/272 |
| 6,364,597 B2 * | 4/2002 | Klinkenberg | ......... | B60P 1/4414 414/462 |
| 6,425,727 B1 | 7/2002 | Hood | | |
| 7,513,069 B1 | 4/2009 | Gamble, II et al. | | |
| 7,537,234 B2 * | 5/2009 | McClellan | .............. | B60P 3/077 280/402 |
| 8,029,228 B2 | 10/2011 | Marmur | | |
| 8,500,102 B2 | 8/2013 | Scott et al. | | |
| 8,905,703 B2 * | 12/2014 | Baechler | ................ | B60P 1/431 414/557 |
| 2001/0014272 A1 | 8/2001 | Ochoa et al. | | |
| 2005/0254925 A1 * | 11/2005 | Braquet | ................ | B60P 1/4492 414/462 |

(Continued)

*Primary Examiner* — Kaitlin Joerger
(74) *Attorney, Agent, or Firm* — Quarles & Brady LLP

(57) ABSTRACT

A lift for attachment to a vehicle is described. The lift includes a hitch assembly with a hitch receiver insert, a first support member, and a second support member. Each of the two support members may include an upper portion and a lower portion, the upper portion oriented at an angle with respect to the associated lower portion. The support members may be mounted to the hitch assembly, at locations separated by a first offset, and may be mounted to a platform assembly, at locations separated by an equivalent second offset. As a lifting mechanism mounted to the hitch assembly provides a lifting force to one of the support members, the platform assembly is raised from a lowered position to a raised position, with a platform included in the platform assembly being maintained, by way of the two equivalent offsets, in a substantially horizontal orientation over the course of travel.

20 Claims, 11 Drawing Sheets

(56) References Cited

U.S. PATENT DOCUMENTS

| | | | |
|---|---|---|---|
| 2007/0177966 A1* | 8/2007 | Niinisto | B60P 1/445 414/557 |
| 2010/0124479 A1* | 5/2010 | Brooks | B60P 1/4471 414/557 |
| 2011/0147020 A1 | 6/2011 | Waltz et al. | |
| 2011/0309651 A1 | 12/2011 | Hernandez et al. | |
| 2013/0230374 A1 | 9/2013 | Kerkvliet | |
| 2014/0079517 A1* | 3/2014 | Ablabutyan | B60P 1/445 414/546 |

\* cited by examiner

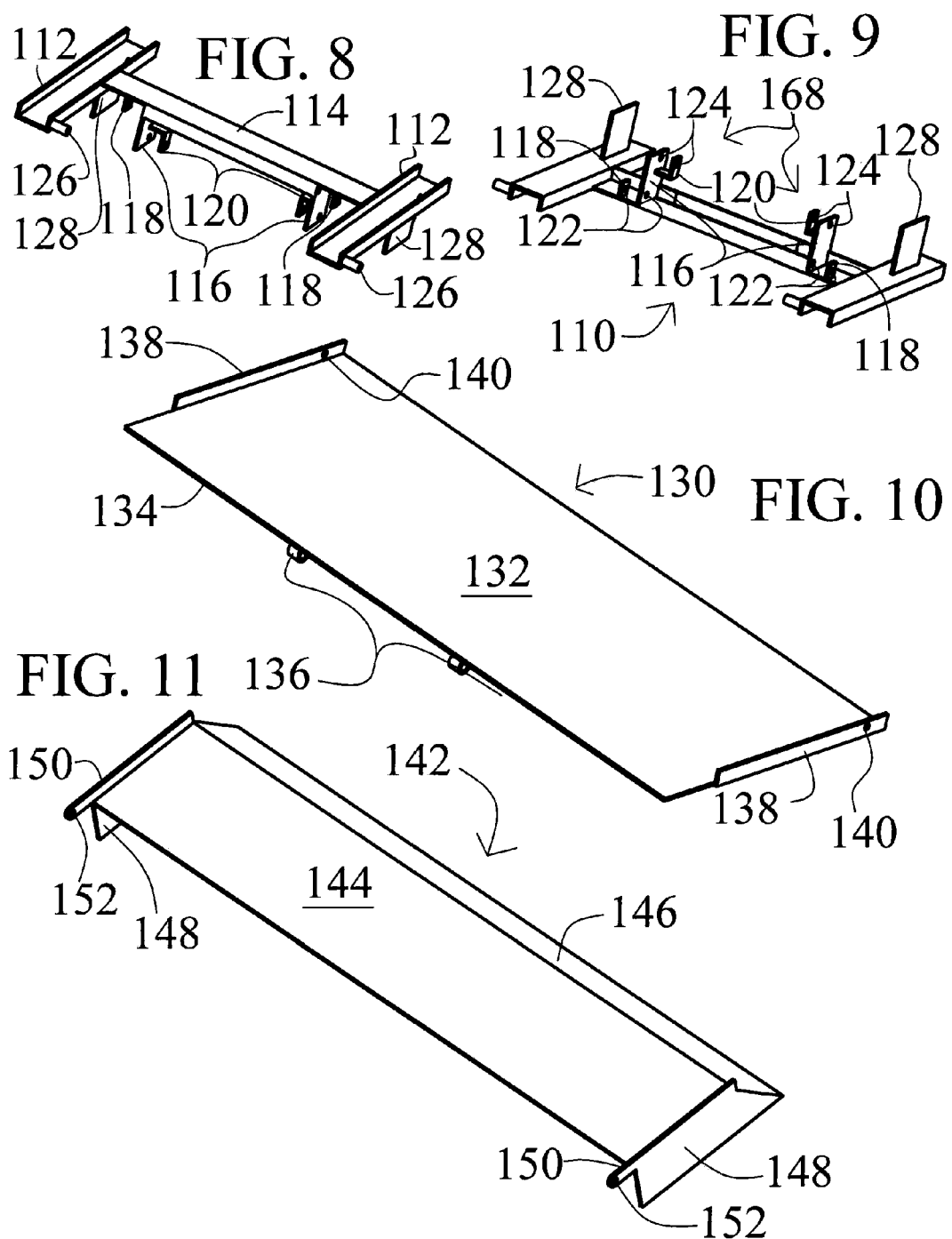

LIFT FOR ATTACHMENT TO VEHICLES

CROSS-REFERENCE TO RELATED APPLICATION(S)

This application claims priority to U.S. Provisional Application 67/797,393 filed Dec. 6, 2012, U.S. Provisional Application 61/855,187 filed May 10, 2013, and U.S. Provisional Application 61/958,731 filed Aug. 8, 2013.

STATEMENT OF FEDERALLY SPONSORED RESEARCH OR DEVELOPMENT

Not applicable.

FIELD OF THE DISCLOSURE

This disclosure relates to lifting and moving objects and materials, including the lifting and moving of objects and materials in order to load and unload various vehicles.

BACKGROUND OF THE DISCLOSURE

It is well known that various activities may require the transport of heavy objects or materials using various types of vehicles. In various instances, for example, consumer vehicles such as pick-up trucks may be used to transport heavy loads between locations, with users loading and unloading heavy objects and materials into and out of the cargo beds of the trucks.

It is also well known that loading objects and materials into cargo beds may represent a difficult task, particularly for heavy objects and materials. For example, with respect to consumer pick-up trucks, the cargo bed may be several feet above the ground. As such, lifting objects and materials from the ground into such a cargo bed (or other cargo area) may require significant expenditure of energy, as may lowering the objects and materials after transport. Indeed, for particularly heavy loads, this lifting and lowering may not be possible without machine assistance.

SUMMARY OF THE DISCLOSURE

A lift is disclosed for lifting and moving objects and materials, including with respect to a vehicle compartment such as a pick-up truck bed.

According to one aspect of the disclosure, a lift includes a hitch assembly with a hitch receiver insert. A first support member includes a first upper section and a first lower section. The first upper section is rotatably mounted to the hitch assembly at a first mounting location and a portion of the first upper section is oriented at an angle to a portion of the first lower section. A second support member includes a second upper section and a second lower section. The second upper section is rotatably mounted to the hitch assembly at a second mounting location that is separated from the first mounting section by a first offset and a portion of the second upper section is oriented at an angle to a portion of the second lower section. A lifting mechanism is mounted to the hitch assembly and has a load bearing connection to the first support member, whereby when activated the lifting mechanism transmits lifting force to the first support member.

The lift further includes a platform assembly with an upper load-bearing surface with a front edge. The first lower section of the first support member is rotatably mounted to a third mounting location on a lower portion of the platform assembly, and the second lower section of the second support member is rotatably mounted to a fourth mounting location on the lower portion of the platform assembly. The third mounting location is separated from the fourth mounting location by a second offset equal to the first offset.

When the hitch receiver insert is secured in the hitch receiver and the lifting mechanism is activated, the platform assembly is moved over a course of travel from a lowered, platform-loading position to a raised, vehicle-loading position. Over the course of travel the upper load-bearing surface of the platform assembly is maintained in a substantially horizontal orientation, with respect to the vehicle, via the first and the second offsets.

One or more of the following features may be included. The first support member may include a generally L-shaped inner support member and the second support member may include a generally L-shaped outer support member. Over the course of travel from the platform-loading position to the vehicle-loading position, the front edge of the upper load-bearing surface may move from a first position that is rearward of the lifting mechanism, with respect to the vehicle, to a second position that is forward of the lifting mechanism, with respect to the vehicle.

The load bearing connection between the lifting mechanism and the first support member may include a cable or a strap, and lifting force may be transmitted from the lifting mechanism to the first support member via a pulley arrangement.

The hitch assembly may include a shim or an offset spacer, with the shim or the offset spacer providing a spacing between the hitch receiver insert of the hitch assembly and an interior wall of the hitch receiver of the vehicle.

The upper load-bearing surface of the platform assembly may be rotatably mounted to the platform assembly. At the vehicle-loading position, the upper load-bearing surface may rotate away from the platform assembly to serve as a replacement gate for a cargo bed of the vehicle.

The platform assembly may include one or more base supports. The one or more base supports may extend below the third and fourth mounting locations to support the weight of the lift, at least in part, when the platform assembly is in the platform-loading position.

According to another aspect of the disclosure, a lift includes a hitch assembly with a hitch receiver insert. A first support member of the lift includes a first upper section and a first lower section. The first upper section is rotatably mounted to the hitch assembly at a first mounting location and a portion of the first upper section is oriented at an angle to a portion of the first lower section. A second support member of the lift includes a second upper section and a second lower section. The second upper section is rotatably mounted to the hitch assembly at a second mounting location that is separated from the first mounting section by a first offset and a portion of the second upper section is oriented at an angle to a portion of the second lower section. A lifting mechanism is mounted to the hitch assembly and has a load bearing connection to the first support member, whereby when activated the lifting mechanism transmits lifting force to the first support member.

The lift further includes a platform assembly with an upper load-bearing surface with a front edge. The first lower section of the first support member is rotatably mounted to a third mounting location on a lower portion of the platform assembly, and the second lower section of the second support member is rotatably mounted to a fourth mounting location on the lower portion of the platform assembly. The third mounting location is separated from the fourth mounting location by a second offset equal to the first offset. One or more rolling supports are attached to one or more of the first and the second support members.

When the hitch receiver insert is secured in the hitch receiver and the lifting mechanism is activated, the platform assembly is moved over a course of travel from a lowered, platform-loading position to a raised, vehicle-loading position. Over the course of travel the upper load-bearing surface of the platform assembly is maintained in an substantially horizontal orientation, with respect to the vehicle, via the first and the second offsets.

One or more of the following features may be included. Over a reversed course of travel for the platform assembly from the vehicle-loading position to the platform-loading position the one or more rolling supports may contact a surface supporting the vehicle before the platform assembly reaches the platform-loading position, causing the one or more rolling supports to support the weight of the lift, at least in part, before the platform assembly reaches the platform-loading position. The contact of the one or more rolling supports with the surface supporting the vehicle, as the platform assembly is moved over the reversed course of travel, may cause a portion of the vehicle to move away from the surface.

According to yet another aspect of the disclosure, a lift includes a hitch assembly with a hitch receiver insert. A first support member of the lift includes a first upper section and a first lower section. The first upper section is rotatably mounted to the hitch assembly at a first mounting location and a portion of the first upper section is oriented at an angle to a portion of the first lower section. A second support member of the lift includes a second upper section and a second lower section. The second upper section is rotatably mounted to the hitch assembly at a second mounting location that is separated from the first mounting section by a first offset and a portion of the second upper section is oriented at an angle to a portion of the second lower section. A lifting mechanism is mounted to the hitch assembly and has a load bearing connection to the first support member, whereby when activated the lifting mechanism transmits lifting force to the first support member.

The lift further includes a platform assembly with an upper load-bearing surface with a front edge. The first lower section of the first support member is rotatably mounted to a third mounting location on a lower portion of the platform assembly, and the second lower section of the second support member is rotatably mounted to a fourth mounting location on the lower portion of the platform assembly. The third mounting location is separated from the fourth mounting location by a second offset equal to the first offset.

One or more lockable hitch assembly stabilizers are rotatably connected to the hitch assembly and extend from the hitch assembly toward the vehicle to contact a rigid structure of the vehicle. Via the contact with the rigid structure of the vehicle, the one or more hitch assembly stabilizers stabilize the hitch assembly against lateral rocking.

When the hitch receiver insert is secured in the hitch receiver and the lifting mechanism is activated, the platform assembly is moved over a course of travel from a lowered, platform-loading position to a raised, vehicle-loading position. Over the course of travel the upper load-bearing surface of the platform assembly is maintained in an substantially horizontal orientation, with respect to the vehicle, via the first and the second offsets.

According to yet another aspect of the disclosure, a lift includes a hitch assembly with a hitch receiver insert. A first support member of the lift includes a first upper section and a first lower section. The first upper section is rotatably mounted to the hitch assembly at a first mounting location and a portion of the first upper section is oriented at an angle to a portion of the first lower section. A second support member of the lift includes a second upper section and a second lower section. The second upper section is rotatably mounted to the hitch assembly at a second mounting location that is separated from the first mounting section by a first offset and a portion of the second upper section is oriented at an angle to a portion of the second lower section. A lifting mechanism is mounted to the hitch assembly and has a load bearing connection to the first support member, whereby when activated the lifting mechanism transmits lifting force to the first support member.

The lift further includes a platform assembly with an upper load-bearing surface with a front edge. The first lower section of the first support member is rotatably mounted to a third mounting location on a lower portion of the platform assembly, and the second lower section of the second support member is rotatably mounted to a fourth mounting location on the lower portion of the platform assembly. The third mounting location is separated from the fourth mounting location by a second offset equal to the first offset.

The lift further includes one or more of a forward stabilizer and a rear stabilizer. The forward stabilizer, if included, is rigidly mounted to one or more of a forward portion of the platform assembly, the first lower section of the first support member, and the second lower section of the second support member. The rear stabilizer, if included, is rigidly mounted to one or more of the first upper section of the first support member, the second upper section of the second support member, and a rearward portion of the platform assembly.

When the hitch receiver insert is secured in the hitch receiver and the lifting mechanism is activated, the platform assembly is moved over a course of travel from a lowered, platform-loading position to a raised, vehicle-loading position. Over the course of travel the upper load-bearing surface of the platform assembly is maintained in an substantially horizontal orientation, with respect to the vehicle, via the first and the second offsets.

As the platform assembly approaches the platform-loading position from the vehicle-loading position the forward stabilizer, if included, one or more of: if mounted to the forward portion of the platform assembly, contacts one or more of the first lower section and the second lower section; and if mounted to one or more of the first lower section and the second lower section, contacts the lower portion of the platform assembly.

As the platform assembly approaches the vehicle-loading position from the platform-loading position the rear stabilizer, if included, one or more of: if mounted to one or more of the first upper section and the second upper section, contacts the lower portion of the platform assembly; and if mounted to the rearward portion of the platform assembly, contacts one or more of the first upper section and the second upper section.

One or more of the following features may be included. As the platform assembly approaches the platform-loading position from the vehicle-loading position the contact of the forward stabilizer, if included, with one or more of the first lower section, the second lower section, and the platform assembly may cause the front edge of the upper load-bearing surface of the platform assembly to tilt upward. As the platform assembly approaches the vehicle-loading position from the platform-loading position the contact of the rear stabilizer, if included, with one or more of the first upper section, the second upper section, and the lower portion of the platform assembly may cause the front edge of the upper load-bearing surface of the platform assembly to tilt downward.

According to yet another aspect of the disclosure, a lift includes a hitch assembly with a hitch receiver insert. A first support member of the lift includes a first upper section and a first lower section. The first upper section is rotatably mounted to the hitch assembly at a first mounting location and a portion of the first upper section is oriented at an angle to a portion of the first lower section. A second support member of the lift includes a second upper section and a second lower section. The second upper section is rotatably mounted to the hitch assembly at a second mounting location that is separated from the first mounting section by a first offset and a portion of the second upper section is oriented at an angle to a portion of the second lower section.

A lifting mechanism and a first plurality of rollers are mounted to the hitch assembly, the first plurality of rollers including a first and a second roller. A second plurality of rollers, including a third and a fourth roller, are mounted to the first support member, with the third roller offset vertically and horizontally from the fourth roller.

One or more of a cable and a strap wind between the first, second, third, and fourth rollers and is configured to receive lifting force from the lifting mechanism, whereby when activated the lifting mechanism transmits lifting force to the first support member via the first, second, third and fourth rollers and the one or more of the cable and the strap.

The lift further includes a platform assembly with an upper load-bearing surface with a front edge. The first lower section of the first support member is rotatably mounted to a third mounting location on a lower portion of the platform assembly, and the second lower section of the second support member is rotatably mounted to a fourth mounting location on the lower portion of the platform assembly. The third mounting location is separated from the fourth mounting location by a second offset equal to the first offset.

When the hitch receiver insert is secured in the hitch receiver and the lifting mechanism is activated, the platform assembly is moved over a course of travel from a lowered, platform-loading position to a raised, vehicle-loading position. Over the course of travel the upper load-bearing surface of the platform assembly is maintained in an substantially horizontal orientation, with respect to the vehicle, via the first and the second offsets. Either of the downward and upward sloping angles may be approximately 45 degrees from horizontal.

One or more of the following features may be included. When the platform assembly is in the platform-loading position a first line between the first and the second roller may form a downward sloping angle, with respect to horizontal, and a second line between the third and the fourth roller may form an upward sloping angle with respect to horizontal.

The details of one or more implementations of the disclosure are set forth in the accompanying drawings and the description below. Other features and advantages will become apparent from the description, the drawings, and the claims.

BRIEF DESCRIPTION OF THE DRAWINGS

FIG. 8 is an upper perspective view of a platform base included in a platform assembly of the example lift of FIG. 1;

FIG. 9 is a lower perspective view of the platform base of FIG. 8;

FIG. 10 is a perspective view of a load-bearing platform included in a platform assembly of the example lift of FIG. 1;

FIG. 11 is a perspective view of a loading ramp for the load-bearing platform of FIG. 10;

Like reference numerals in the drawings indicate like components, parts, or operations.

DETAILED DESCRIPTION

Figure 1:
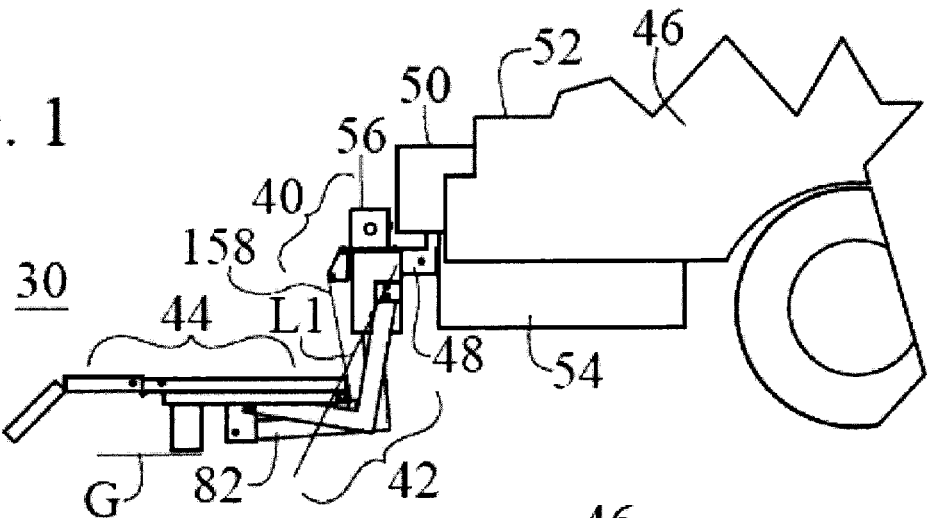
FIG. 1 is a side view of an example lift mounted to a pick-up truck and in a platform-loading position.

The following describes one or more example implementations of the disclosed system and method, as shown in the accompanying figures of the drawings described briefly above. As will be clear from the discussion below, various embodiments of the disclosed lifts may be mounted to the rear of a vehicle (e.g., via a rear hitch receiver) for loading of the vehicle via a lifting motion that is generally aligned with the major front-to-back axis of the vehicle. For convenience, the words "forward," "front," "rear," "rearward" and so on will be used with respect to a lift placed in this orientation (i.e., mounted to the rear of a vehicle, with a lifting motion generally aligned with the front-to-back axis of the vehicle). As such, for example, "forward" may refer to a direction that is toward the front of the vehicle (and lift) in the above configuration and "rearward" may refer to a direction that is away from the front of the vehicle (and lift) in the above configuration. Likewise, unless otherwise clarified, "horizontal" may be used below to refer to an orientation that is parallel with the major front-to-back axis of a relevant vehicle. As such, for example, with respect to a vehicle located on flat ground, "horizontal" may refer to a true horizontal orientation (i.e., an orientation parallel to the flat ground). Finally, the term "opposite" may be used to refer to an orientation that is generally opposed, but not necessarily exactly opposed to a reference location. For example, a location that is "opposite" a central point, with respect to a reference point may generally be on the opposite side of the central point from the reference point, but may not necessarily be the same distance from (or above or below) the central point as the reference point.

As discussed in greater detail herein, it may be useful to provide a lift that may allow for loading and unloading of large or heavy loads into and out of various vehicles. It may also be useful to provide a portable lift that may be easily attached to existing vehicle components (e.g., standard hitch receivers) in order to allow the lift to be used with a variety of vehicle types without requiring substantial user adjustments. In particular, it may be useful to provide a lift that may be mounted to a variety of consumer vehicles, such as pick-up trucks, in a relatively short time and with relatively little effort, which lift may then provide a stable lifting platform for a variety of objects and materials.

To date, a variety of lifts have been provided for loading vehicles, including pick-up trucks. Some of these lifts, for example, utilize known parallel linkage architectures to maintain a load-bearing platform in a horizontal orientation during a lifting operation. The range of lifting motion for these lifts, however, tends to be limited because of the nature of the parallel linkage designs currently employed. In general, current lift designs do not facilitate lifting a loading platform to a position that is above or forward of the source of lifting power, with respect to the orientation of the relevant vehicle. Further, existing designs may tend to be unstable when away from a central portion of the range of possible motion, which may lead to further limitations on the lifts' range of useful lifting motion as well as the maximum rated load. Various available lifts, for example, may be capable of stable operation only within a 90-degree (or smaller) range of motion and only with loads of 500 pounds or less. These may represent significant limitations with respect to lift utility.

In certain embodiments, the lifts disclosed herein (and the various components thereof) may introduce significant improvements with respect to the issues noted above (and various others). In certain embodiments, the disclosed lifts may be easily mounted to the hitch receiver of a variety of existing vehicles without the need to change parts or make difficult adjustments. Through the use of an innovative support member configuration, the lifts may facilitate lifting of weights of 1,500 pounds or more over an extended range of motion, with significant platform stability. The disclosed lifts may also maintain a load-bearing platform at an horizontal orientation (e.g., substantially parallel with the ground or a cargo bed of a relevant vehicle) over a substantial portion of a lifting operation, and may exhibit a range of motion for the lifting platform that extends from below and behind to above and forward of the source of lifting power. This may be facilitated by an innovative support structure and may, for example, both help to maintain loads in a more stable state over the full course of a lifting operation and allow for easier loading of even very heavy objects.

In certain embodiments, a hitch assembly included in a lift may include a hitch receiver insert that may be secured in a standard hitch receiver of a consumer vehicle through various known means (e.g., through a locked pin). The hitch assembly may also include a lifting mechanism such as an electrically powered winch, hydraulic cylinder, electronic actuator, and so on.

The lift may include at least two elbowed support members. One end of each of the support members may be rotatably mounted to the hitch assembly, with the other end of each of the members being rotatably mounted to the underside of a separate platform assembly. The distance between the mounting points at the opposite ends of one of the support members (e.g., the hypotenuse of an L-shaped support member) may be the same as the distance between the mounting points at the opposite ends of the other support members. Likewise, the distance between the two mounting locations (for the support arms) on the hitch assembly may be the same as the distance between the two mounting locations (for the support arms) on the platform assembly. In this way, an effective parallel linkage may be implemented via the support members and the rotatable mounts of the support members to the hitch and platform assemblies. This may allow a platform included on the platform assembly to be lifted in a generally horizontal orientation from a platform-loading position (e.g., with the support members fully lowered) and a vehicle-loading position (e.g., with the support members fully raised).

Notably, the use of elbowed (or similar) configuration for the support members may facilitate an expanded range of motion for a lifting operation using the described lift. For example, in certain embodiments the front edge of the lifting platform may be behind and below the lifting mechanism when in a platform-loading position (e.g., when the lift is fully or nearly-fully lowered for loading from the ground) and may be above and in front of the lifting mechanism when in a vehicle-loading position (e.g., when the lift is fully or nearly-fully raised for unloading of the platform onto the vehicle). In this way, for example, the front edge of the lifting platform may be beneficially lifted from a location that is below and behind the vehicle bumper (i.e., in a platform-loading position) to a location that is above and in front of the vehicle bumper (i.e., in a vehicle-loading position), which may facilitate easy loading (or unloading) of the vehicle. (It will be understood, despite the naming convention described above, that a lift platform may be loaded from the vehicle in the vehicle-loading position and may be unloaded onto the ground in the platform-loading position.)

The configuration described above may further facilitate keeping the load being lifted relatively close to the body of the vehicle, versus conventional lift designs, thereby increasing lifting stability. For example, with generally L-shaped support members, the support members may be mounted to the platform assembly rearward of the front of the platform assembly (e.g., near a front-to-rear midpoint of the platform assembly). At a lowered position, the platform assembly may then actually rest on the lower leg(s) of the "L" of the support members, thereby increasing stability at the platform-loading position. Moreover, as a lifting operation is begun, this rearward mounting of the support members may also beneficially locate the weight to be lifted relatively closely to the vehicle and to the lifting mechanism (which may be mounted to the hitch assembly that is mounted to the vehicle). This may allow for lifting of greater loads with a given lifting mechanism (e.g., a winch of a particular rating) and may result in less vehicle movement (e.g., sagging into the vehicle's rear shocks) as the lift is operated.

Figure 2:
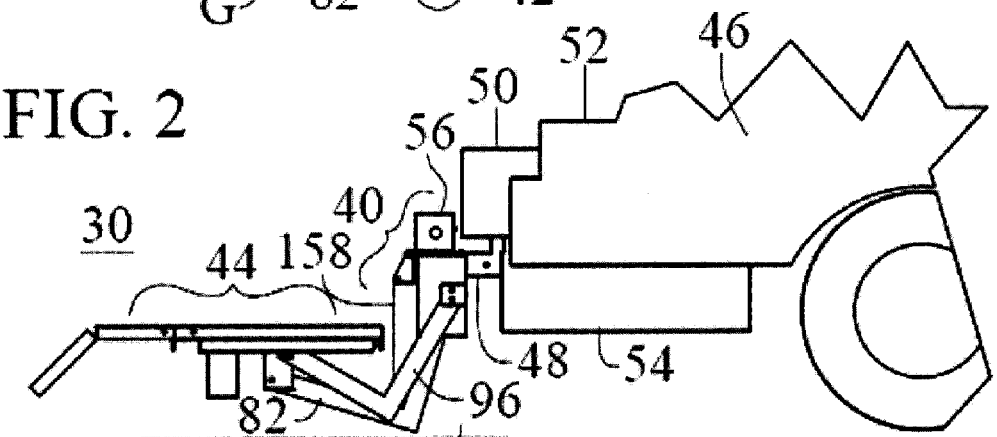
FIG. 2 is a side view of the example lift of FIG. 1, during a lifting operation.
Figure 3:
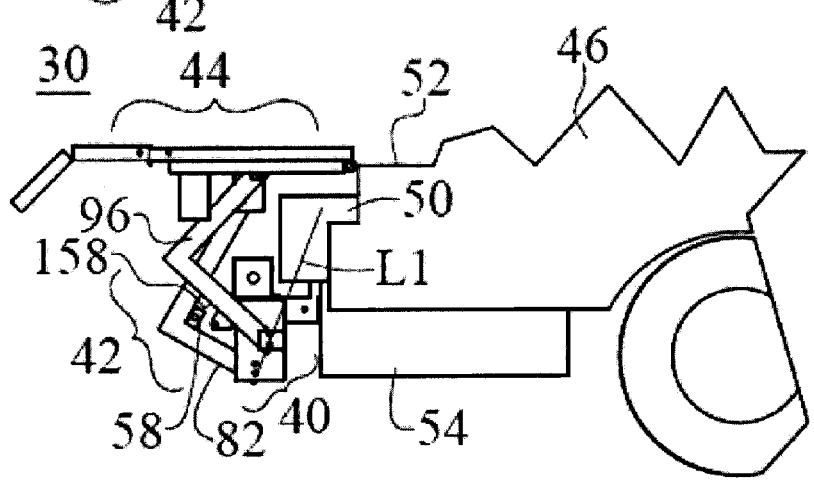
FIG. 3 is side view of the example lift of FIG. 1, in an vehicle-loading position.

Referring now to FIGS. 1-3, various side views are presented of an example lift contemplated by this disclosure. As can be seen in FIGS. 1-3, lift 30 may include hitch assembly 40, support assembly 42 and platform assembly 44, each of which will be discussed in greater detail below. Lift 30 may be mounted to vehicle 46 for operation. Vehicle 46 may, for example, be a consumer pick-up truck having standard 2-inch hitch receiver 48 located below bumper 50 and cargo bed 52.

Various underbody extensions, such as spare tire 54 or tube stock extending from hitch receiver 48 (not shown) may also be included in vehicle 46. It will be understood, based on the discussion herein, that a contemplated lift (e.g., lift 30) may be configured for use with a variety of vehicle types and configurations. For example, lift 30 may be configured for use with a variety of consumer pick-up trucks or other hitch-equipped vehicles, even those these trucks or other vehicles may exhibit various heights between bed 52 and the ground (indicated as "G" in the various figures) or between hitch receiver 48 and the ground. For example, in certain embodiments, the same lift 30 may be used, without modification, with trucks having heights of 30.5 to 36.5 inches between bed 52 and the ground, trucks having heights of 16 to 21 inches between the center of hitch receiver 48 and the ground, and trucks having heights of 14 to 18 inches between the center of hitch receiver 48 and bed 52.

In FIG. 1, lift 30 is depicted in (or near) a platform-loading position. In a platform-loading position, lift 30 may be lowered such that various portions of lift 30 (e.g., base supports 128) are supported by the ground, thereby allowing the platform assembly 44 to be loaded with a load to be lifted. In FIG. 2, winch 56 (or another lifting mechanism) has been activated, causing support assembly 42 to begin to lift platform assembly 44 with respect to hitch assembly 40. For example, a cable or strap from winch 56 (e.g., cable/strap 158) may be connected to anchor 58 on support assembly 42 in order to transmit lifting force to support assembly 42. It can be seen that as platform assembly 44 is lifted from the orientation of FIG. 1 (e.g., a platform-loading orientation) to the orientation of FIG. 2, it maintains a relatively horizontal load-bearing surface, due to the effective parallel linkage of support assembly 42. (As used herein, "cable" may refer to a generally cable-, rope-, or cord-like component for transmitting pulling (e.g., lifting) force and "strap" may refer to a generally flat or otherwise strap-like component for transmitting pulling (e.g., lifting) force.)

Continuing, in FIG. 3, lift 30 may have been fully lifted to a vehicle-loading position, in which a front edge of platform assembly 44 is in contact with cargo bed 52 (or suitably near cargo bed 52 for transfer of loads between platform assembly 44 and bed 52). As in FIG. 2, it can be seen that platform assembly 44 continues to maintain a horizontal orientation for the load-bearing platform, even though the front edge of platform assembly 44 has been lifted above and in front of winch 56 (from behind and below the winch).

Figure 4:
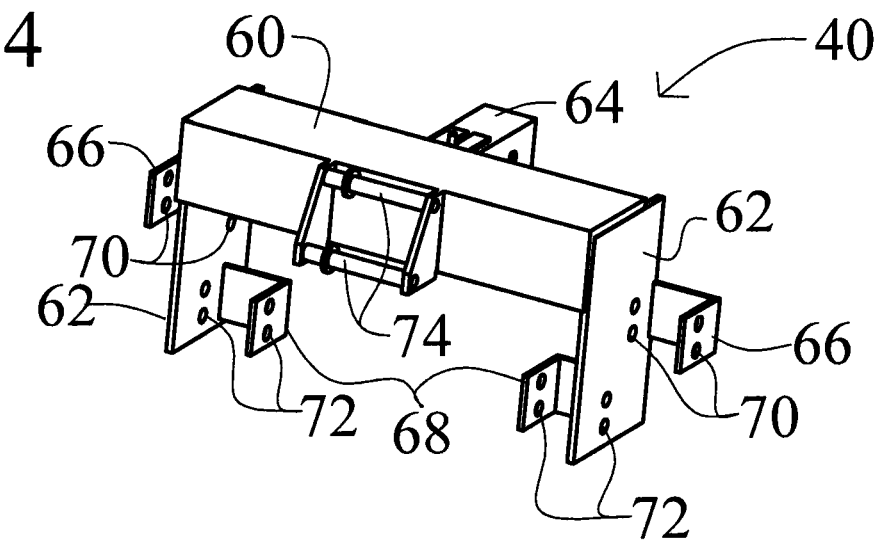
FIG. 4 is a perspective view of a hitch assembly of the example lift of FIG. 1.
Figure 5:
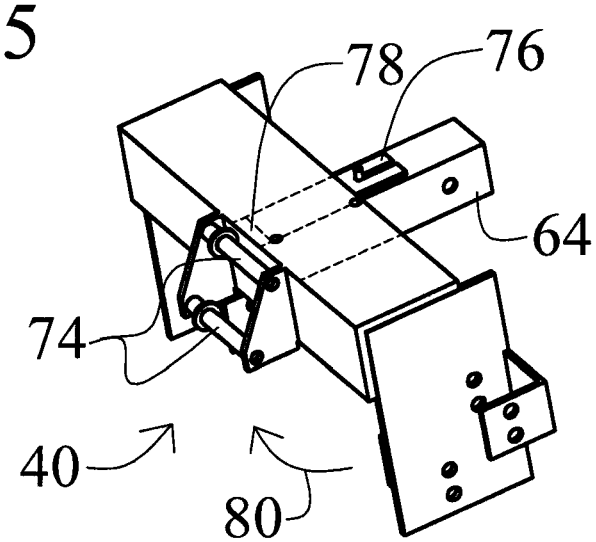
FIG. 5 is another perspective view of the hitch assembly of FIG. 4.

Referring also to FIGS. 4 and 5, one embodiment of hitch assembly 40 is presented. Hitch assembly 40 may include, for example, top surface 60 and side supports 62 as well as hitch receiver tube 64 or other known means for securely connecting hitch assembly 40 to vehicle 46. As depicted, for example, hitch receiver tube 64 may be configured to be slid into a hitch receiver (e.g., standard hitch receiver 48) of vehicle 46. Hitch receiver tube 64 may then, for example, be pinned (or otherwise fixed) into place in order to anchor lift 30 with respect to vehicle 46 in order to provide a base for lifting operations. As also noted above, lift 30 may be configured with appropriate dimensions such that hitch receiver tube 64 may be easily inserted into a hitch receiver of a variety of vehicles and configurations, including without requiring lift 30 to be lifted off the ground for the insertion.

As also noted above, support assembly 42 may be rotatably secured to hitch assembly 40 in order to facilitate lifting operations. As such, hitch assembly 40 and support assembly 42 (as discussed in greater detail below) may include various complementary connection means. For example, hitch assembly 40 may include outer support tabs 66 with various pin-receiving holes 70, as well as inner support tabs 68 with various pin-receiving holes 72. Corresponding pin-receiving holes 70, 72 may also be provided in side walls 62, to facilitate secure anchoring of inserted pins in order to provide a rotatable connection. As depicted, support tabs 64 and 68 may each include multiple pin-receiving holes 70, 72 in order to facilitate manual adjustment of the connection between support assembly 42 and hitch assembly 40. In certain embodiments, a greater or fewer number of pin-receiving holes 70, 72 may alternatively be provided. For example, under a standardized configuration, lift 30 may be suitable for mounting to and operation with vehicles having a range of bed and hitch receiver heights, without the need to provide multiple pin-receiving holes 70, 72 for adjustment. (It will be understood that although many examples herein discuss the use of pinned connections, various other connection types of similar effect—e.g., a rotatable connection—may be utilized in various embodiments.)

Hitch assembly 40 may include a lifting mechanism, such as a winch (not shown in FIGS. 4 and 5). In certain embodiments, an electrically driven lifting mechanism may be utilized, such as an electric winch. In this way, power may be easily provided to the lifting mechanism from vehicle 46. For example, to provide power for a lifting operation, a user may simply connect the lifting mechanism to a power cable from vehicle 46 (e.g., a standard 12V connecting cable) once the hitch assembly 40 is mounted to the vehicle. Hitch assembly 40 may further include one or more hitch assembly rollers 74, which may guide a cable, strap or other connecting device that extends from the lifting mechanism in order to provide lifting force to support assembly 44.

It will be understood that vehicle hitch receivers (e.g., hitch receiver 48) may be manufactured with varying tolerances with respect to a nominal size. This may be desirable from a general perspective as larger tolerance between the inner walls of a hitch receiver and the outer walls of a hitch receiver insert may allow for easy insertion of the insert as well as prevent the insert from binding in the receiver. This larger tolerance, however, may detrimentally affect lifting operations as it may allow receiver insert 64 to wobble within receiver 48, thereby causing platform assembly 44 (and a load resting thereupon) to also wobble. In order to address this issue, hitch assembly 40 may further include one or more shim 76 and offset spacer 78. As needed, depending on the actual tolerance between receiver 48 and insert 64, shim 76 or spacer 78 may be utilized to provide an improved fit between receiver 48 and insert 64 and thereby prevent excessive wobble (e.g., in the direction of arrow 80).

Figure 6:
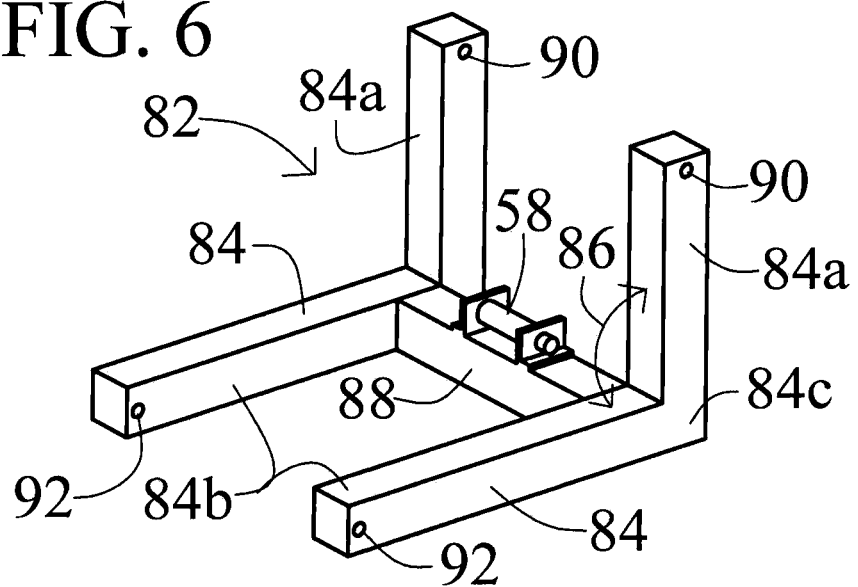
FIG. 6 is perspective view of a first support member of the example lift of FIG. 1.

Referring also to FIG. 6, various components of support assembly 42 are presented. As depicted in FIG. 6, for example, square tubing stock may be utilized to form inner support legs 84 of inner leg assembly 82. Each side of support leg 84 may include upper section 84*a* as well as lower section 84*b*, which may be joined by elbow 84*c*. As will become apparent from the discussion herein, the orientation of upper sections 84*a* at an angle 86 with respect to lower sections 84*b* may facilitate the extended range of lifting motion that is possible with lift 30. It will be understood, however, that such an angled orientation may be maintained without requiring a particular measurement for angle 86. For example, angle 86 may be equal to, more, or less than 90° in various embodiments. Similarly, one or both sides of support legs 84 may be formed from curved stock, such that a portion of upper section 84*a* may be oriented at an angle with respect to a portion of lower section 84*b* without necessarily requiring an angled elbow 84*c*.

As also noted throughout this disclosure, in certain embodiments various components of support assembly 42 (e.g., support legs 84 (see above) or 98 (see below)) may be configured as generally L-shaped components. It will be understood that an L-shaped component may include two legs joined to each other at an approximately 90° angle. A generally L-shaped component may generally conform with the shape of an L-shaped component, but may exhibit additional features (e.g., additional extensions, protrusions, legs and so on), may exhibit a joining angle between the two legs of more or less than a 90° angle, and so on.

It will also be understood that while support legs 84 and various other components discussed herein may be described as being formed from particular materials (e.g., square tubing stock, c-bar stock, and so on), other configurations and constructions may be possible, in keeping with this disclosure. For example, solid bar stock, various tubing types, i-bar stock, or other stock or material may be utilized. Likewise, it will be understood that support legs 84 (or various other portions of lift 30) may be formed as integral pieces (e.g., though casting) or as combinations of distinct components (e.g., via welding, bolted connections, and so on), with the word "assembly" being used generally herein to refer to both of these possible construction approaches.

Support legs 84 may include various mechanisms or features to allow for the rotatable connection of support legs 84 to both hitch assembly 40 and platform assembly 44. For example, support legs 84 may include pin-receiving holes 90 that may be configured to align with pin-receiving holes 70 of hitch assembly 40 when the upper end of upper section 84*a* is inserted between outer support tabs 66 and side walls 62 of hitch assembly 40. Similarly, pin-receiving holes 92 may be included for rotatable connection of lower section 84*b* of support legs 84 to platform assembly 44.

In certain embodiments, support assembly 42 may include one or more anchors 58 at which a strap or cable (or other force transmitting means) from the lifting mechanism (e.g., winch 56) may connect to support assembly 42. As depicted in FIG. 6, for example, anchor 58 may include one or more support assembly rollers, which may be mounted on cross support 88 between the two support legs 84. It will be understood, however, that other configurations may be possible. For example, an anchor point (e.g., rollers for a cable or strap) may be mounted to the sides of support legs 84 rather than on cross support 88. Similarly, an anchor point may be include on support legs 98 (e.g., FIG. 7 (anchor point not shown)) rather than (or in addition to) being mounted on support legs 84. In certain embodiments anchor 58 may be configured to form part of a pulley arrangement, which may facilitate use of lower rated lifting mechanisms for larger loads. For example, anchor 58 may be configured (as shown) as support assembly roller 58 which, together with hitch assembly rollers 74 (e.g., as in FIG. 5), may form a pulley assembly to multiply the lifting force of winch 56. It will be understood, in this context, that such "rollers" may not necessarily rotate (or otherwise move), although they may contribute to various beneficial effects of a pulley arrangement, such as force multiplication. It will further be understood that various alternative pulley arrangements may be possible, as may be selected based upon considerations including the visibility of a strap or cable as it passes through a pulley arrangement (e.g., for inspection to identify proper functioning, wear on the strap or cable, and so on).

In certain embodiments, the orientation of anchor 58 (e.g., configured as support assembly rollers 58) may also contribute in other ways to the enhanced lifting power and range of motion of the disclosed lift. For example, in FIG. 6 it can be seen that support assembly rollers 58 are mounted relatively closely to elbow 84*c* of inner support legs 84. Referring also back to FIGS. 1-3, it can be seen that such an orientation may ensure that a cable or strap (or other connection) extending between hitch assembly roller 74 (or winch 56) and support legs 84 does not interfere with platform assembly 44. Further, as can also be seen in FIGS. 1-3, such an orientation of support assembly rollers 58 may ensure that lifting force may be provided to support legs 84 (and thereby also to platform assembly 44) over the full range of motion from the platform-loading position of FIG. 1 to the vehicle-loading position of FIG. 3, even though platform assembly 44 may be lifted above hitch assembly roller 74 (and winch 56) in order to reach the vehicle-loading position.

Figure 7:
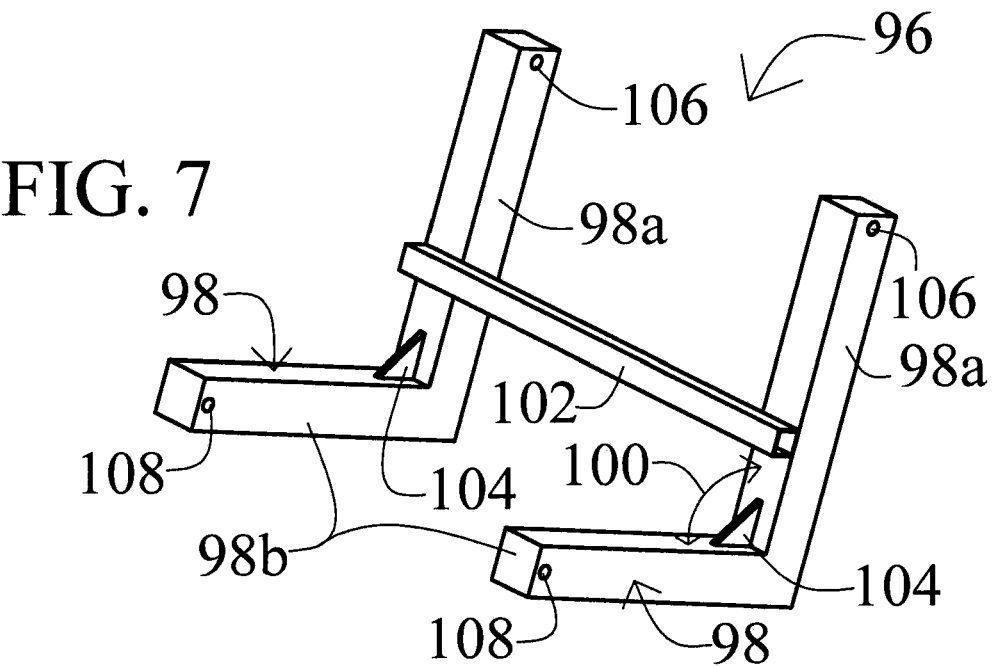
FIG. 7 is a perspective view of a second support member of the example lift of FIG. 1.

Referring also to FIG. 7, various additional components of support assembly 42 are presented. For example, lift 30 may also include outer support legs 98 of outer leg assembly 96. As depicted in FIG. 7, for example, square tubing stock may be utilized to form outer support legs 98. Each side of support legs 98 may include upper section 98*a* as well as lower section 98*b*, which may be joined by elbow 98*c*. As will become apparent from the discussion herein, the orientation of upper sections 98*a* at an angle 100 to lower sections 98*b* facilitates the extended range of lifting motion that is possible with lift 30. It will be understood, however, that such orientation may be maintained without requiring a particular measurement for angle 100. For example, angle 100 may be equal to, more, or less than 90° in various embodiments. Similarly, one or both sides of support legs 98 may be formed from curved stock, such that a portion of upper section 98*a* is oriented at an angle with respect to a portion of lower section 98*b* without necessarily requiring an angled elbow 98*c*.

As with inner support legs 84, outer support legs 98 may include various mechanisms or features to allow for rotatable connection of support legs 98 to hitch assembly 40 and platform assembly 44. For example, support legs 98 may include pin-receiving holes 106 that may be configured to align with pin-receiving holes 72 of hitch assembly 40 when the upper end of upper section 98a is inserted between inner support tabs 68 and side walls 62 of hitch assembly 40. Similarly, pin-receiving holes 108 may be included for rotatable connection of lower section 98*b* of support legs 98 to platform assembly 44.

As also noted above, in order to assist in maintaining a horizontal orientation of platform assembly 44 during a lifting operation, support legs 84 and 98 may act as members of an effective parallel linkage. As such, in certain embodiments, the distance between opposite ends of the respective support legs 84 and 98 may be equal. For example, the distance between pin-receiving holes 90 and 92 on one of support legs 84 may be equal to the distance between pin-receiving holes 106 and 108 on one of support legs 98. (It will be understood that due to the nature of manufacturing and component assembly, some variation in parts may occur. In this regard, with respect to the discussion herein, a distance may be considered as "equal" to another (or the "same" and so on) so long as the distances are approximately equal.)

Referring also to FIGS. 8 and 9, upper and lower perspective views of platform base 110 of platform assembly 44 are presented. Platform base 110 may, for example, provide a connection point (or points) for legs 84 and 98 of support assembly 40, as well as structural support for a load-bearing platform (not show in FIGS. 8 and 9). Platform base 110 may include, for example, support members 112 arranged parallel to the major axis of vehicle 46 (i.e., parallel to hitch receiver insert 64), and cross support 114 connecting support members 112. Support members 112 are depicted as being formed from c-stock (in various orientations). It will be understood, however, that other configurations (and orientations) may be possible.

Platform base 110 may also include various mechanisms or features to allow for rotatable connection of support legs 84 and 98 to platform assembly 44. For example, platform base 110 may include pin supports 116 extending downward from support members 112, with outer support tabs 118, inner support tabs 120, and various pin-receiving holes 122 and 124. When the ends of lower sections 84b of support legs 84 are inserted between inner support tabs 120 and pin support 116, pin-receiving holes 92 and 124 may be aligned, allowing for a pinned connection (or other rotatable connection) between platform base 110 and support legs 84. Likewise, when the ends of lower sections 98b of support legs 98 are inserted between outer support tabs 118 and pin support 116, pin-receiving holes 108 and 122 may be aligned, allowing for a pinned connection between platform base 110 and support legs 98. In order to maintain the effective parallel linkage discussed above, the offset between pin-receiving holes 122 and 124 may be the same as an offset between pin-receiving holes 70 and 72 of hitch assembly 40.

In certain embodiments, platform base 110 may include integral mounting pins 126, which may facilitate a rotational connection with a platform. In certain embodiments, platform base 110 may also include base supports 128, which may contact the ground in the platform-loading position and may, accordingly, bear some (or all) of the weight of lift 30 when the lift platform is being loaded. Base supports 128 may extend below pin supports 116, as well as elbows 84c and 98c, in the platform-loading position.

Other considerations may also inform the configuration of base supports 128. For example, it will be understood that instability of a parallel linkage may increase as one set of mounting points (e.g., pin-receiving holes 122 and 124) pass through a plane defined by the other set of mounting points (e.g., pin-receiving holes 70 and 72). In this light, referring again to FIG. 1, as pin-receiving holes 122 and 124 approach line L1 (as defined by pin-receiving holes 70 and 72), lift instability may increase. Accordingly, it may be appropriate to configure base supports 128 to be sufficiently long so as to assume the weight of lift 30 (at least in part) before pin-receiving holes 122 and 124 approach too closely to line L1.

As can be seen in FIGS. 1-3, for example, support assembly 42 (e.g., via support legs 84 and 98) may connect to platform base 110 (or another portion of platform assembly 44) at a point that is substantially rearward of the front edge of the relevant platform. This may represent another distinct advantage of the disclosed lift. It will be recognized, for example, that through the use of angled support legs 84 and 98, and this rearward connection between support assembly 42 and platform base 110, both the anchor point for lifting (i.e., support assembly rollers 58) as well as the front edge of platform assembly 42 may be located relatively closely (from a horizontal perspective) to hitch assembly roller 74. This may further facilitate the stable lifting of significant loads, including to points above the actual lifting mechanism.

Referring also to FIG. 10, load-bearing platform 130 may be mounted to platform base 110. For example, pin receivers 136 near front edge 134 of platform 130 may receive mounting pins 126 of platform base 110 in order to rotatably connect platform 130 to platform base 110. (In certain embodiments, additional connections or supports (e.g., hinged support bars connecting near the back edge of platform 130) may also be provided (not shown).) In order to facilitate raising platform 130 to the vehicle-loading position of FIG. 3, it will be understood that a tailgate of cargo bed 52 may need to be removed. Beneficially, in such a case, the rotatable connection between pins 126 and pin receivers 136 may allow for platform 130 to be rotated into place as a replacement tailgate for cargo bed 52, thereby allowing for appropriate containment of material in cargo bed 52 with lift 30 still in place (and without replacing the removed tailgate).

Platform 130 may include load-bearing surface 132, which may, for example, be constructed from diamond-plate or other material, or appropriate coated, in order to resist load slippage. In certain embodiments, side rails 138 may be provided, with rails 138 including pin-receiving holes 140 for mounting other components or assemblies. In certain embodiments, other structure may also be provided, such as reinforcing ribs along the underside of surface 132 (not shown).

Referring also to FIG. 11, ramp 142 may include top surface 144 and sloped surface 146 (or, in certain embodiments, only sloped surface 146). Sides 148 may include pin members 150, which may themselves include pin-receiving holes 152 (or, for example, integral pins (not shown)). Pin-receiving holes 152 may be aligned with pin-receiving holes 140 on platform 130 in order to rotatably mount ramp 142 to platform 130. Accordingly, when platform 130 is in the platform-loading position (e.g., FIG. 1), ramp 142 may assist in transferring heavy loads from the ground onto platform 130. As with platform 130, various other structure may also be provided, such as reinforcing ribs along the underside of ramp 142 (not shown).

Figure 12:
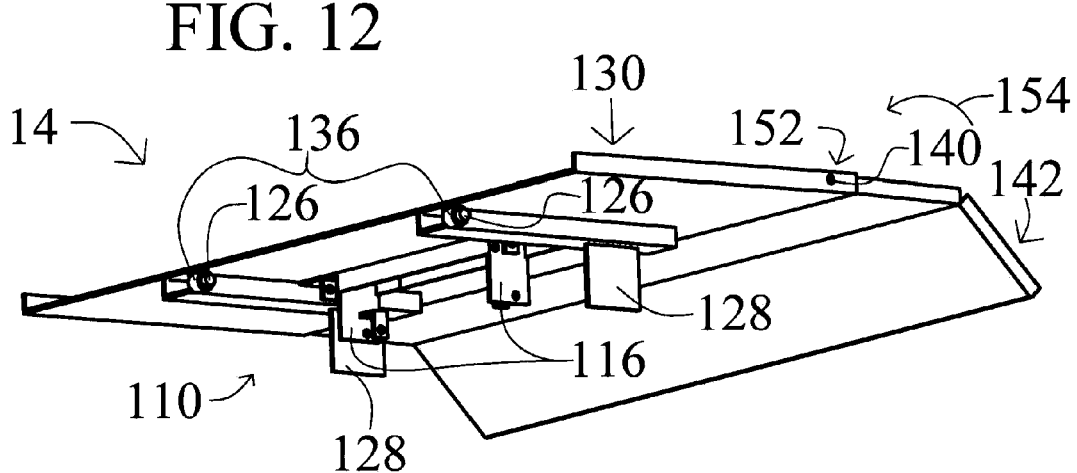
FIG. 12 is a lower perspective view of the load-bearing platform of FIG. 10 and the loading ramp of FIG. 11 mounted to the platform base of FIGS. 8 and 9.

Referring also to FIG. 12, a lower perspective view of platform assembly 44 is presented, with sides 148 of ramp 142 removed for clarity. As can be seen in FIG. 12, mounting pins 126 may be inserted into pin receivers 136 in order to rotatably mount platform 130 to platform base 110.

Figure 13:
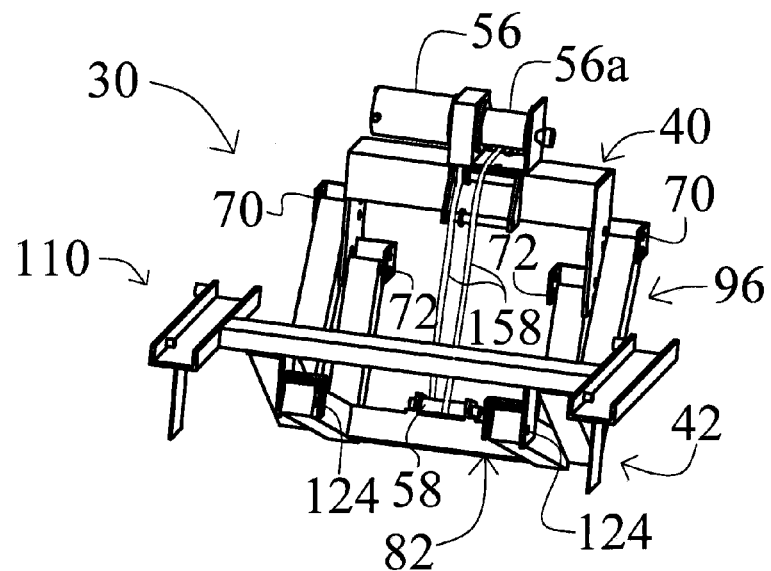
FIG. 13 is a rear perspective view of the lift of FIG. 1 with the load-bearing platform removed.

Referring also to FIG. 13, a rear perspective view of lift 30 is presented, with platform 130 removed for clarity. In order to install lift 30 on, for example, a pick-up truck, a user may remove the tailgate of the truck cargo bed, insert hitch receiver insert 64 into the truck hitch receiver (e.g., a standard 2-inch receiver), secure insert 64 with a hitch pin, connect the lifting mechanism (e.g., winch 56 coupled to spool 56a) to a power source (e.g., a standard 12 V terminal from the truck), pin hinged platform 130 to platform base 110, and use the lifting mechanism to orient the platform 130 appropriately (e.g., lower platform 130 to the lowered, platform-loading position in order to load platform 130 with a load to be lifted into the truck bed). In certain embodiments, a wireless remote control may be provided for control of the lifting mechanism. Once a loading (or unloading) operation has been completed, a user may remove lift 30 and replace the tailgate of the cargo bed. Alternatively, a user may leave lift 30 secured in the vehicle hitch receiver desired, rotate platform 130 around a rotatable connection to platform base 110 (e.g., a connection via mounting pins 126 and pin receivers 136, as depicted in FIG. 12).

It will be understood, based on the discussion herein, that lift 30 may exhibit various important dimensional relationships. For example, as also noted above, the offsets between mounting points for the support arms may be carefully designed in order to create the effective parallel linkage. As another example, referring again to FIG. 1, the length of upper sections 84a and 98a of support members 84 and 98 may be selected to be short enough, and the size of angles 86 and 100 to be large enough, so that the lift does not contact spare tire 54 or other obstacles near hitch receiver 48 when in (or near) the platform-loading position and so that elbows 84c and 98c do not scrape excessively on the ground. Likewise, the lengths of upper sections 84a and 98a and lower sections 84b and 98b, and the size of angle 86 and 100 may be selected to be large enough, and the extension of platform 130 forward of pin supports 116 small enough, to allow platform assembly 44 to clear hitch assembly 40 as the lift is raised or lowered. Further, the length of lower sections 84b and 98b and angles 84c and 98c may be selected so as to prevent undesired contact between platform assembly 44 and upper sections 84a and 98a. A balance may also be chosen between placing anchor 58 further rearward on one of the support members (e.g., inner support member 82), in order to increase lifting efficiency at lowered orientations (e.g., orientations at or near the platform-loading orientation), and ensuring that platform assembly 44 does not interfere with cable/strap 158 between anchor 58 and winch 56 (or with another lifting mechanism).

Figure 14:
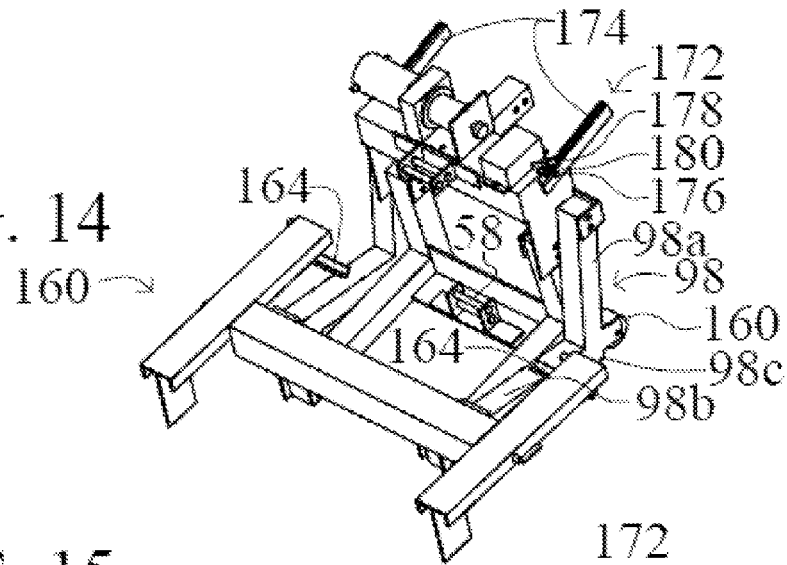
FIGS. 14 and 15 are perspective views of another example lift, with a load-bearing platform removed.
Figure 15:
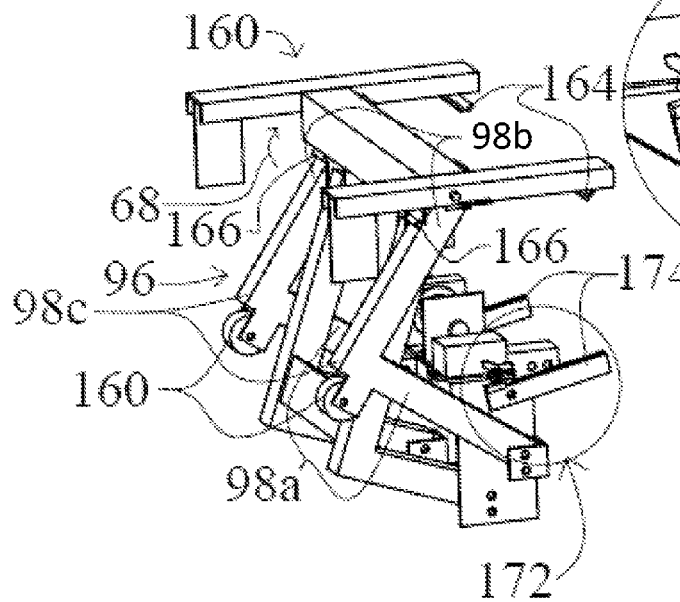
Figure 15A:
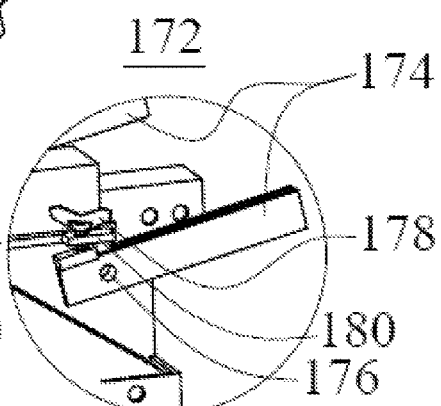
FIG. 15A is an enlarged view of stabilizing mechanisms included in the example lift of FIGS. 14 and 15.

In certain embodiments, various additional components or assemblies may be included in order to increase the stability of lift 30. For example, referring also to FIGS. 14 and 15, hitch assembly stabilizers 172 may be included on hitch assembly 40. For example, as also depicted in the enlarged view of FIG. 15A, hitch assembly stabilizers 172 may include rigid members 174, which may extend from pinned connections 176 toward vehicle 46. Through a locking mechanism, rigid members 174 may be placed in contact with a rigid portion of vehicle 46 (e.g., bumper 50, tube stock extending laterally from hitch receiver 48 (not shown), and so on) and secured against rotation around pinned connections 176. As such, a rigid connection (in addition to the connection between hitch receiver 48 and hitch receiver insert 64) may be formed between hitch assembly 40 and vehicle 46, thereby assisting in the stabilization of lift 30. For example, thumb screws 178 may be threaded through threaded tabs 180 in order to lock rigid member 174 into contact with vehicle 46 and against rotation about pinned connection 176. This may stabilize hitch assembly 40 by resisting undesirable lateral rotation (or wobbling) of hitch assembly 40 with respect to vehicle 46, thereby lending further stability to platform 130 (not shown in FIGS. 14 and 15) and any load resting on it.

Figure 16:
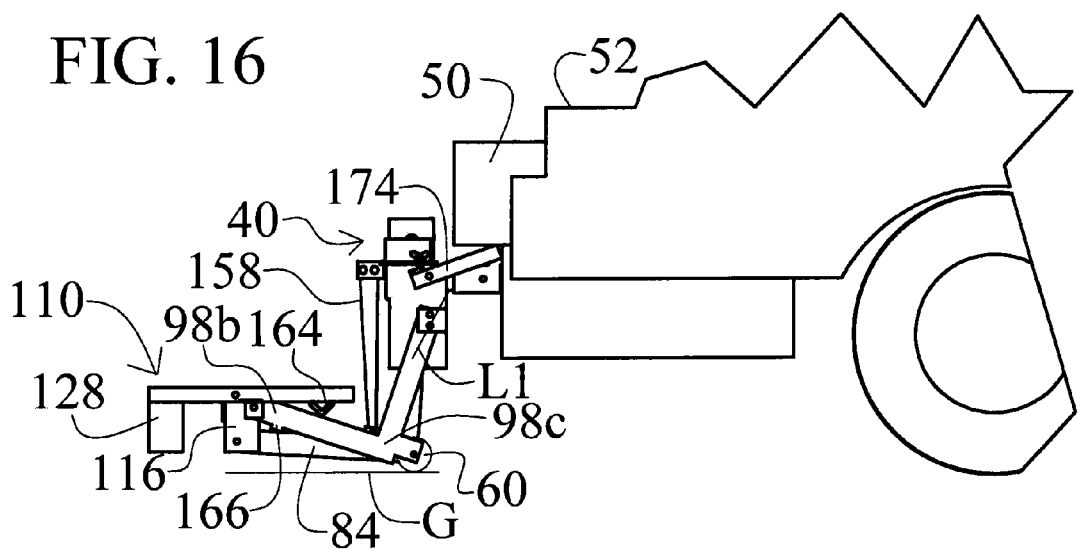
FIGS. 16 and 17 are side views of the example lift of FIGS. 14 and 15.

Other stability mechanisms may also be utilized. For example, forward stabilizers 164 and rear stabilizers 166 may be provided. Forward stabilizers 164, for example, may be rigid bodies mounted to the underside of a forward portion of platform base 110. Referring also to FIG. 16, as lift 30 approaches the lower platform-loading position, stabilizers 164 may come into contact with portions of support assembly 42 (e.g., outer support legs 98). This contact may not only resist lateral wobble of platform 130 (via platform base 110) but may also act to urge forward edge 134 of platform 130 somewhat upwards. Depending in part on the height of stabilizers 164 (and the corresponding contact point on support assembly 42), this may result in platform 130 tilting slightly upward (back-to-front) as lift 30 approaches the platform-loading position, thereby facilitating easier loading of platform 130, while introducing a gravitationally-driven bias away from vehicle 46 for any load on platform 130.

Figure 17:
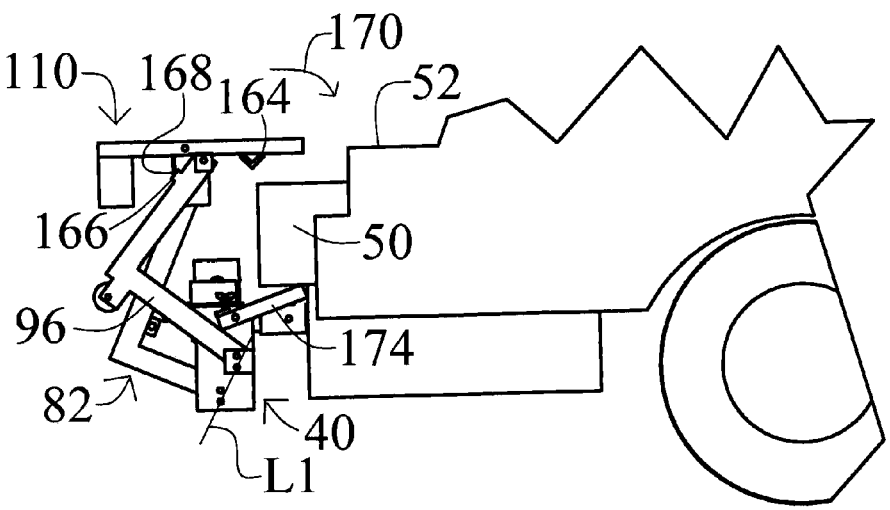

Similarly, rear stabilizers 166 may be rigid bodies mounted to the underside (in a platform-loading position) of a portion of support assembly 42 (e.g., outer support legs 98). Referring also to FIG. 17, as lift 30 approaches the higher vehicle-loading position, stabilizers 166 may come into contact with a portion of the platform assembly 44 (e.g., underside extension 138 of platform base 110). This contact may not only resist lateral wobble of platform 130 (via platform base 110) but may also act to urge forward edge 134 of platform 130 somewhat downwards. Depending in part of the height of stabilizers 166 (and the corresponding contact point on platform assembly 44), this may result in platform 130 tilting slightly downwards (back-to-front) as lift 30 approaches the vehicle-loading position, thereby facilitating easier unloading of platform 130 into vehicle 46, while introducing a gravitationally-driven bias toward vehicle 46 for any load on platform 130.

It will be understood that various alternative configurations may be possible. For example, both rear stabilizers 166 and forward stabilizers 164 may generally operate on the principle of introducing a rigid contact point between support assembly 42 and platform assembly 44 as lift 30 approaches, respectively, a raised vehicle-loading orientation and a lowered platform-loading orientation. As such, for example, it will be understood that forward stabilizers 164 might alternatively be configured as rigid bodies mounted to portions of support assembly 42, with the stabilizers contacting a rigid portion of platform assembly 44 as lift 30 approaches the platform-loading position. Likewise, it will be understood that rear stabilizers 166 might alternatively be configured as rigid bodies mounted to platform assembly 44, with the stabilizers contacting a rigid portion of support assembly 42 as lift 30 approaches the vehicle-loading position. In such cases, the general operation of stabilizers 166 and 164 may be similar to that described above, although the location of various components may have been rearranged.

It will also be understood that the heights or locations of the various stabilizers 164 and 166, as well as the configuration and orientation of the respective contact points for the stabilizers, may be adjusted in order to vary when and to what extent the stabilizers are engaged during operation of lift 30. For example, stabilizers 164 of greater heights might be provided in order to provide stabilization earlier in the progression toward the platform-loading position or to cause a larger tilting of platform 130 once stabilizers 164 are engaged. Similar considerations may also apply with respect to stabilizers 166 and the progression toward the vehicle-loading position. In certain embodiments, the height of stabilizers 164 and 166 (or corresponding configuration of the contact points for these stabilizers) may be selected so that stabilizers 164 and 166 are engaged appropriately early in the approach of pin-receiving holes 122 and 124 to line L1.

Still referring to FIGS. 14-17, in certain embodiments support rollers 160 may be provided on one or both of support legs 84 and 98 (or another location). In certain embodiments, rollers 160 may facilitate easy transport of lift 30 between locations. For example, rollers 160 may support the weight of lift 30 allowing the lift to be rolled from a storage location to a location of vehicle 46, for mounting of lift 30 on vehicle 46. In certain embodiments a handle (not shown) may be provided that provides a convenient grip for a user as the user pulls (or pushes) lift 30 on rollers 160.

In certain embodiments, rollers 160 may also further facilitate the use of lift 30 with a variety of vehicles with different mounting configurations (e.g., vehicles with different cargo bed heights or hitch mount heights), without necessarily requiring other adjustments to lift 30 (or the relevant vehicles). For example, rollers 160 may be used to roll lift 30 from a storage location to a mounting location (i.e., a location at the rear of vehicle 46). With lift 30 still supported by rollers 160, hitch receiver insert 64 may be inserted into hitch receiver 48. When insert 64 is secured in receiver 48, the weight of lift 30 in combination with the rolling support of rollers 160 may impart an upward force on vehicle 46. This may lift vehicle 46 somewhat, thereby allowing lift 30 to be used even with vehicles having lower hitch receiver heights. (It will be understood that the above-noted lifting may not necessarily raise vehicle 46 off the ground. Rather, in certain instances, a portion of the weight of vehicle 46 may be removed from the suspension of vehicle 46, thereby allowing the body of vehicle 46 to move upwards, without the wheels of vehicle 46 necessarily leaving the ground.)

Figure 18:
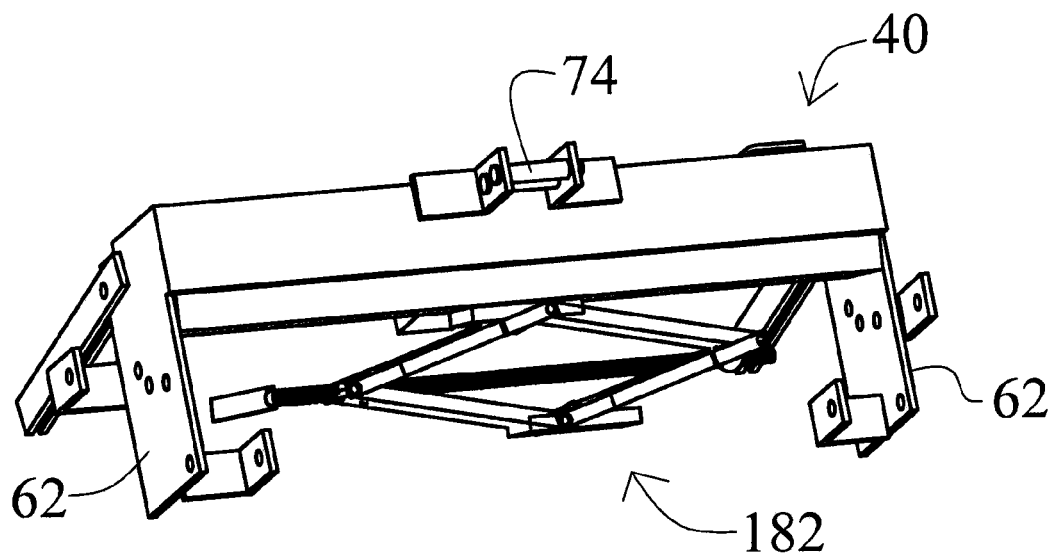
FIGS. 18 and 19 are perspective views of a hitch assembly including a jack.
Figure 19:
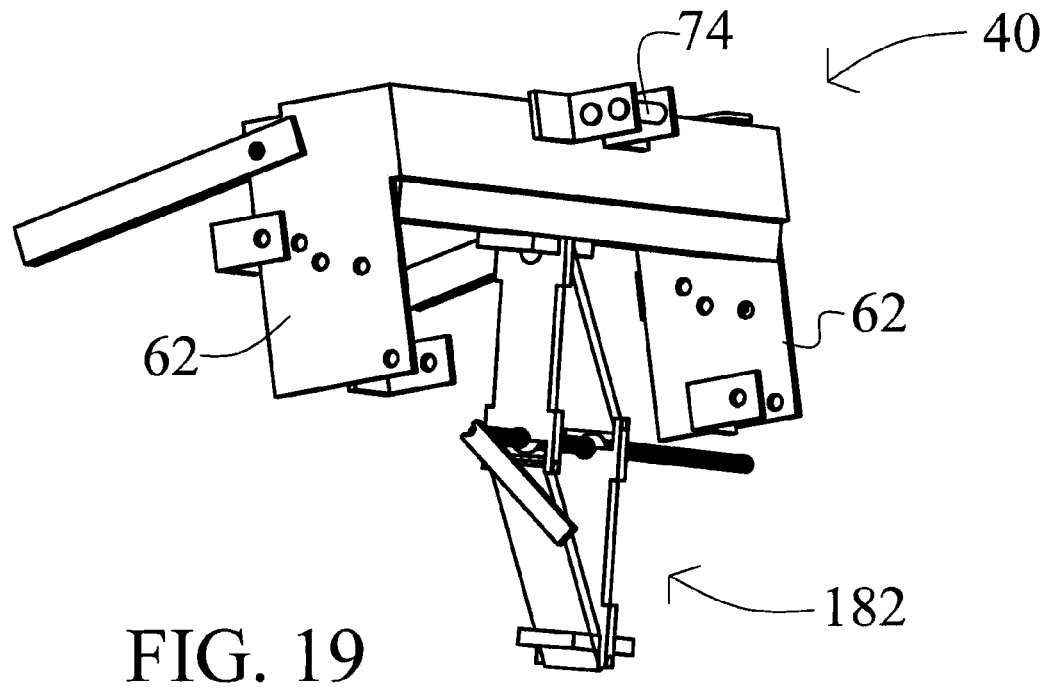
Figure 20:
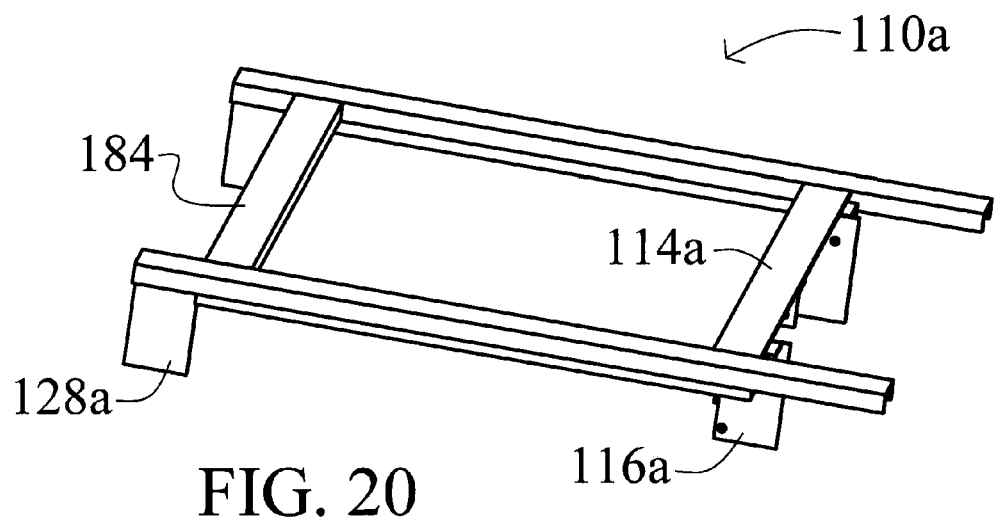
FIG. 20 is a perspective view of an extended platform base included in a platform assembly of another example lift.

Referring also to FIGS. 18 and 19, a jack (e.g., scissors jack 182) may be provided as an additional support for hitch assembly 40. In certain embodiments, the potentially high lifting capacity of lift 30 may allow users to lift very heavy loads into vehicles. These heavy loads, however, may cause undesirable movement of the vehicles. For example, because lift 30 may be attached to a rear hitch receiver of a vehicle (e.g., receiver 48 of vehicle 46), use of lift 30 with a particularly heavy load may cause the rear of the vehicle to sag excessively. As such, it may be useful to provide an additional support for lift 30 that is somewhat independent of the associated vehicle. As also noted above, such a support may be in the form a jack, such as scissors jack 182 attached to hitch assembly 40.

In certain embodiments, platforms of various sizes may be utilized with lift 30. This may, for example, facilitate lifting of larger loads, such as motorcycles, ATVs, snowmobiles, and so on. Further, in certain embodiments a platform of lift 30 may be utilized to effectively extend the cargo bed of a relevant vehicle. For example, referring also to FIGS. 20-23, extended platform base 110*a* is depicted, having base supports 128*a* to support platform base 110*a* against the ground, and pin supports 116*a* on cross support 114*a* for rotatably mounting a portion of support assembly 42 (e.g., support legs 84 and 98) to platform base 110*a*. It will be noted that, in certain embodiments, base supports 128*a* may be located near the rear edge of base support 110*a* in order to more fully support extended platform assembly 44*a*. Likewise, it will be noted that pin supports 116*a* may still be located rearward of front edge 134*a* of extended platform 130*a*, although not necessarily near the center of platform 130*a*.

Figure 21:
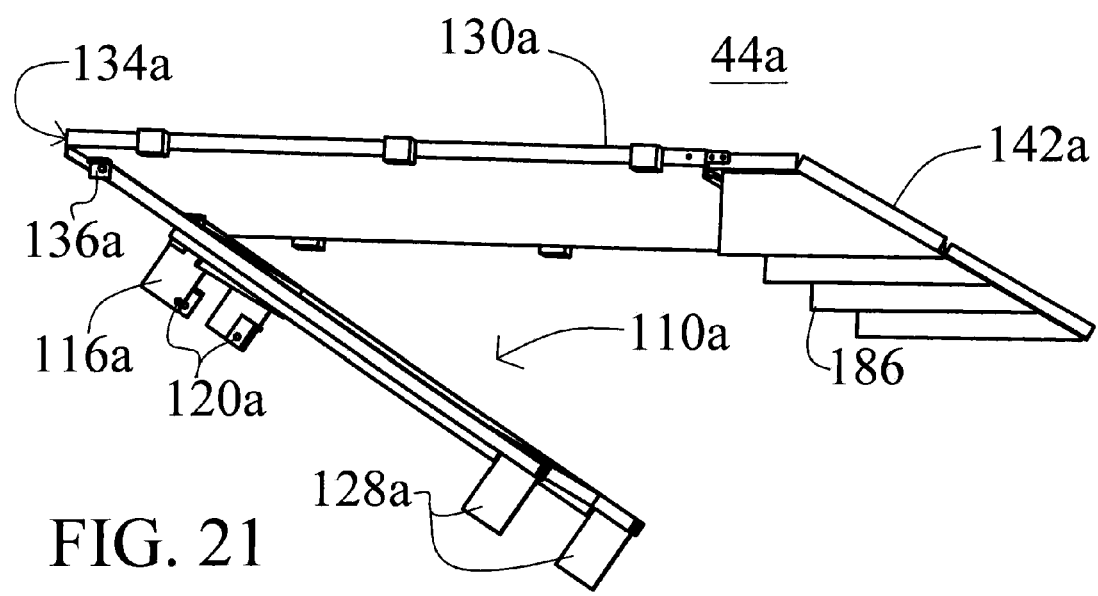
FIG. 21 is a perspective view of an extended load-bearing platform mounted to the platform base of FIG. 20.
Figure 22:
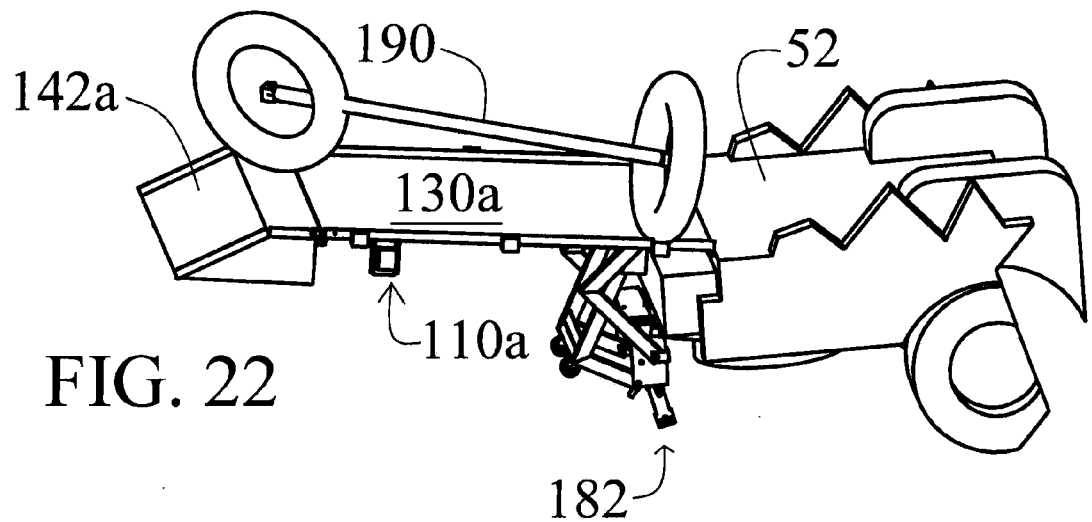
FIGS. 22 and 23 are perspective views of an example lift in operation, with the extended load-bearing platform of FIG. 21.
Figure 23:
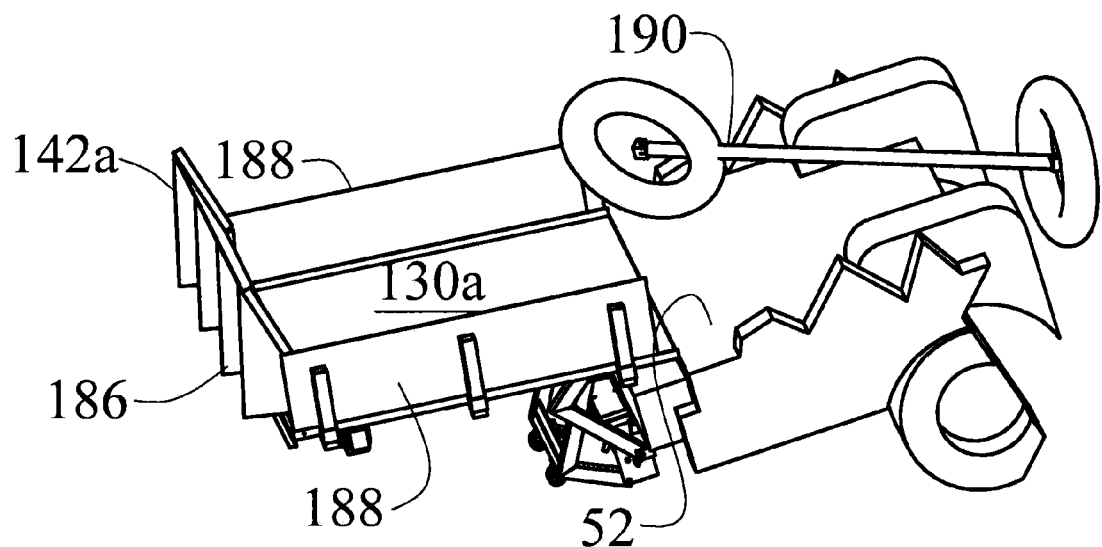

Referring specifically to FIGS. 22 and 23, extended platform 130*a* (or another platform) may serve as an extension of cargo bed 52, which may be useful, for example, if a load (e.g., motorcycle 190) does not fully fit on bed 52. In certain embodiments, hinged ramp 142*a* (also depicted in FIG. 21) may also be provided for easier loading and unloading of platform 130*a*. In certain embodiments (and as depicted in FIGS. 21-23), ramp 142*a* may be provided with ribs 186 for strength. Likewise, ribs or other strengthening members may be provided for platform 130*a* or platform base 110*a*. In certain embodiments, ramp 142*a* may be rotatably mounted to platform 130*a* and may accordingly be rotated upwards (as in FIG. 23) to serve as a tailgate for the extension of cargo bed 52 provided by extended platform 130*a*. In certain embodiments, raised sides 188 may be provided to platform 130*a* (or platform base 110*a*) in order to further contain the extended cargo bed (as also depicted in FIG. 23).

Figures 24, 25:
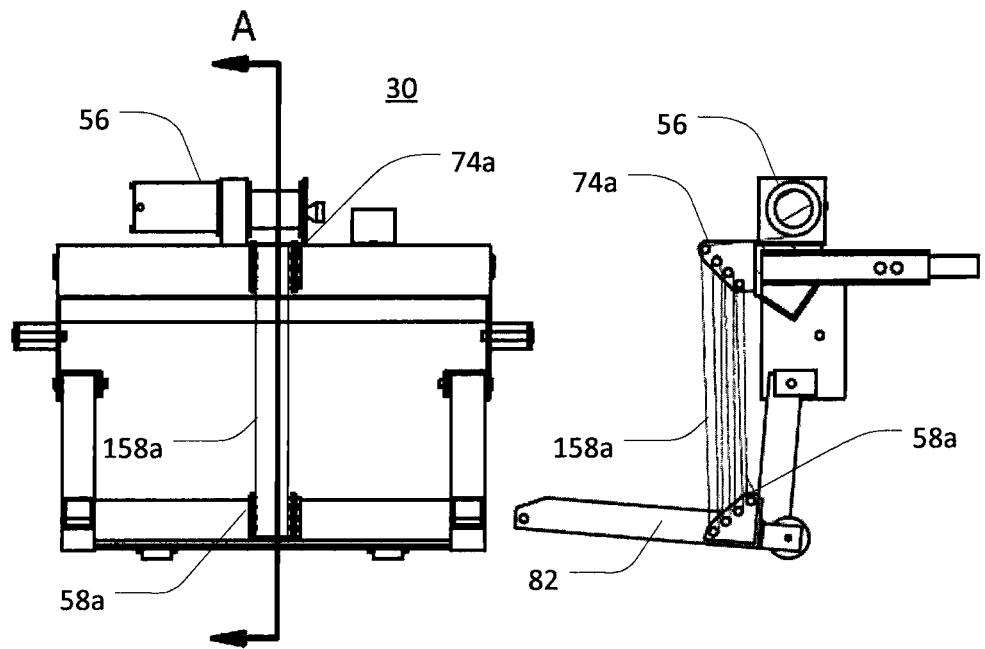
FIG. 24 is a rear view of an example lift including an angled pulley configuration.
FIG. 25 is a cross-sectional side view of the example lift of FIG. 24.
Figures 26, 27:
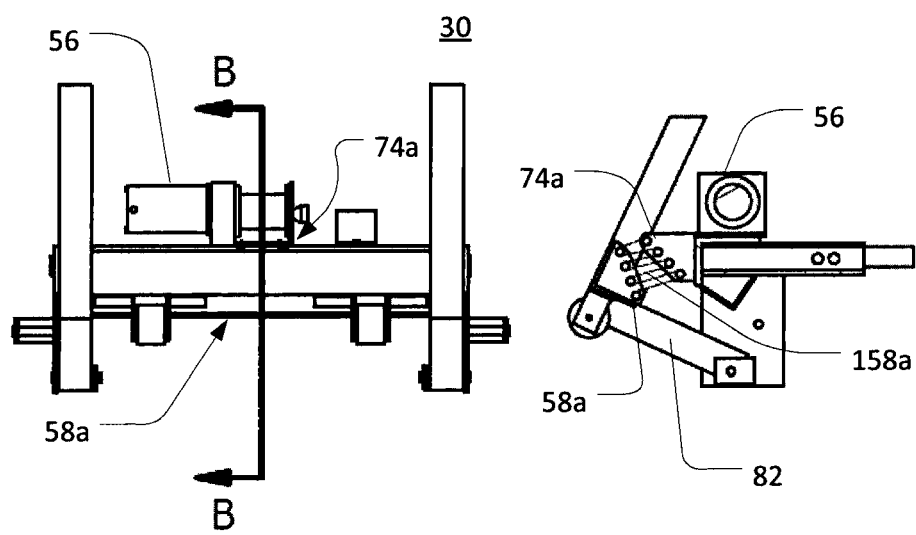
FIG. 26 is another rear view of the example lift of FIG. 24.
FIG. 27 is another cross-sectional side view of the example lift of FIG. 24.

Referring also to FIGS. 24-27, aspects of certain embodiments of the connection between the lifting power source (e.g., winch 56), rollers 74 and anchor 58 are depicted. FIGS. 24 and 26 depict, respectively, an embodiment of lift 30 in a lowered and a raised orientation. FIG. 25 depicts a side view of lift 30 as configured in FIG. 24, taken through section A-A of FIG. 24. FIG. 27 depicts a side view of lift 30 as configured in FIG. 26, taken through section B-B of FIG. 26. For clarity of presentation, platform 130 and base support 110 are not depicted in FIGS. 24-27.

As can be seen in FIGS. 24-27 (and as also discussed above), various pulley configurations may be utilized in order to transmit lifting force from the lifting mechanism (e.g., winch 56) to platform 130 (e.g., via anchor 58 on inner leg assembly 82). For example, four rollers 74*a* (which may or may not actually rotate) may be provided near winch 56 and four rollers 58*a* may be provided on inner leg assembly 82. Strap 158*a* may extend from winch 56 and wind between the various rollers 74*a* and 58*a*, in order to multiply the lifting force of winch 56, as applied to leg assembly 82 (and platform 130 (not shown)).

In certain embodiments, it may be useful to orient rollers 74*a* and rollers 54*a* at an angle with respect to horizontal. (In this regard, an angle may be referred to as sloping or angling "upward" (or "up," and so on) if it rises from back to front (with respect to vehicle 46). Likewise, an angle may be referred to as sloping or angling "downward" (or "down," and so on) if it falls from back to front (with respect to vehicle 46).) As depicted in FIGS. 25, for example, when platform assembly 44 is near the platform-loading (lowered) position, rollers 74*a* may be oriented along a line angling down (from front to back) at approximately 45° and rollers 58*a* may be oriented along a line angling up (from front to back) at approximately 45°. As can be seen in FIG. 25, such an angled (or otherwise offset) orientation of rollers 74*a*, in combination with such an angled (or otherwise offset) orientation of rollers 58*a* may provide appropriate clearance between strap 158*a* and various other components of lift 30 (including other portions of strap 158*a*) when lift 30 is at a lowered orientation, while also allowing easy visual inspection of strap 158*a* (e.g., to investigate wear or verify appropriate alignment). Further, as can be seen in FIG. 27, as support legs 82 are raised the complementary angled orientations of rollers 74*a* and 58*a* may ensure that appropriate clearance is maintained throughout the lifting operation. Indeed, due in part to the angled orientation of rollers 74*a* and 58*a*, it can be seen that even when lift 30 is raised to the vehicle-loading position, there is appropriate clearance between the various portions of strap 158*a* as well as between strap 158*a* and various other components of lift 30.

It will be understood that the various rollers (e.g., rollers 74*a* or 58*a*) need not necessarily be oriented along a straight line for the considerations discussed herein to apply. For example, similarly useful clearance may be maintained with various of rollers 74*a* oriented at an angled offset from other of rollers 74*a* (with respect to horizontal), without the rollers 74*a* collectively defining a single straight line. Likewise, appropriate clearance may also be maintained with various of rollers 58*a* orientated at an angled offset from other of rollers 58*a* (with respect to horizontal), without the rollers collectively defining a single straight line.

As also noted above, in various embodiments anchor 58 (and, for example, rollers 58*a*) may not necessarily be located on inner leg assembly 82. As such, it will be understood that the discussion above regarding rollers 74*a* and 58*a* may be equally applicable to embodiments of lift 30 in which anchor 58 (and rollers 58*a*) are not located on inner leg assembly 82. Further, it will be understood that the discussion above may also apply with respect to various roller configurations than those explicitly depicted in the Figures, configurations using a cable or other connector rather than strap 158*a*, and so on The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A lift for attachment to a vehicle with a hitch receiver, the lift comprising:
    a hitch assembly including a hitch receiver insert;
    a first support member including a first upper section and a first lower section, wherein the first upper section is rotatably mounted to the hitch assembly at a first mounting location and a portion of the first upper section is oriented at an angle with respect to a portion of the first lower section;
    a second support member including a second upper section and a second lower section, wherein the second upper section is rotatably mounted to the hitch assembly at a second mounting location separated from the first mounting section by a first offset and a portion of the second upper section is oriented at an angle with respect to a portion of the second lower section;
    a lifting mechanism mounted to the hitch assembly and having a load bearing connection to the first support member, whereby when activated the lifting mechanism transmits lifting force to the first support member;
    a platform assembly including an upper load-bearing surface with a front edge, wherein the first lower section of the first support member is rotatably mounted to a third mounting location on a lower portion of the platform assembly and the second lower section of the second support member is rotatably mounted to a fourth mounting location on the lower portion of the platform assembly, the third mounting location being separated from the fourth mounting location by a second offset equal to the first offset;
    a forward stabilizer rigidly mounted to one or more of the first lower section of the first support member, the second lower section of the second support member, and a location on the platform assembly that is forward of at least one of the third and fourth mounting locations;
    wherein, when the hitch receiver insert is secured in the hitch receiver and the lifting mechanism is activated, the platform assembly is moved over a course of travel from a lowered, platform-loading position to a raised, vehicle-loading position, with the upper load-bearing surface of the platform assembly being maintained in a substantially horizontal orientation, with respect to the vehicle, over a majority portion of the course of travel, via the first and the second offsets;
    wherein, as the platform assembly approaches the platform-loading position from the vehicle-loading position, the forward stabilizer one or more of:
        if mounted to the platform assembly, contacts one or more of the first lower section of the first support member and the second lower section of the second support member; and
        if mounted to one or more of the first lower section of the first support member and the second lower section of the second support member, contacts the lower portion of the platform assembly forward of at least one of the third and fourth mounting locations; and
    wherein, the contact of the forward stabilizer with the one or more of the first lower section of the first support member, the second lower section of the second support member, and the lower portion of the platform assembly causes at least part of the upper load-bearing surface of the platform assembly to tilt upward, from a back-to-front perspective.

2. The lift of claim 1, wherein over the course of travel the front edge of the upper load-bearing surface moves from a first position that is rearward of the lifting mechanism, with respect to the vehicle, to a second position that is forward of the lifting mechanism, with respect to the vehicle.

3. The lift of claim 1, wherein the load bearing connection between the lifting mechanism and the first support member includes one or more of a cable and a strap; and
    wherein the lifting force is transmitted from the lifting mechanism to the first support member via one or more pulley arrangements.

4. The lift of claim 1, wherein the hitch assembly includes one or more of a shim and an offset spacer, the one or more of the shim and the offset spacer providing a spacing between the hitch receiver insert of the hitch assembly and an interior wall of the hitch receiver of the vehicle.

5. The lift of claim 1, wherein the upper load-bearing surface of the platform assembly is rotatably mounted to the platform assembly.

6. The lift of claim 5, wherein the vehicle includes a cargo bed with a removable gate;
    wherein the gate is removed from the vehicle for operation of the lift; and
    wherein at the vehicle-loading position the upper load-bearing surface of the platform assembly rotates away from the platform assembly to serve as a replacement gate for the cargo bed.

7. The lift of claim 1, wherein the platform assembly includes one or more base supports, the one or more base supports extending below the third and the fourth mounting locations and supporting the weight of the lift, at least in part, when the platform assembly is in the platform-loading position.

8. The lift of claim 1, further comprising:
    one or more rolling supports attached to one or more of the first support member and the second support member;
    wherein, over a reversed course of travel for the platform assembly from the vehicle-loading position to the platform-loading position, the one or more rolling supports contact a surface supporting the vehicle before the platform assembly reaches the platform-loading position, thereby causing the one or more rolling supports to support the weight of the lift, at least in part, before the platform assembly reaches the platform-loading position.

9. The lift of claim 8, wherein the contact of the one or more rolling supports with the surface supporting the vehicle, as the platform assembly is moved over the reversed course of travel, causes a portion of the vehicle to move away from the surface.

10. A lift for attachment to a vehicle with a hitch receiver, the lift comprising:
    a hitch assembly including a hitch receiver insert;
    a first support member including a first upper section and a first lower section, wherein the first upper section is rotatably mounted to the hitch assembly at a first mounting location and a portion of the first upper section is oriented at an angle with respect to a portion of the first lower section;

a second support member including a second upper section and a second lower section, wherein the second upper section is rotatably mounted to the hitch assembly at a second mounting location separated from the first mounting section by a first offset and a portion of the second upper section is oriented at an angle with respect to a portion of the second lower section;

a lifting mechanism mounted to the hitch assembly and having a load bearing connection to the first support member, whereby when activated the lifting mechanism transmits lifting force to the first support member;

a platform assembly including an upper load-bearing surface with a front edge, wherein the first lower section of the first support member is rotatably mounted to a third mounting location on a lower portion of the platform assembly and the second lower section of the second support member is rotatably mounted to a fourth mounting location on the lower portion of the platform assembly, the third mounting location being separated from the fourth mounting location by a second offset equal to the first offset; and one or more lockable hitch assembly stabilizers rotatably connected to the hitch assembly and rotatably extending from the hitch assembly toward the vehicle to contact a rigid structure of the vehicle, wherein, via the contact with the rigid structure of the vehicle, the one or more hitch assembly stabilizers stabilize the hitch assembly against lateral rocking;

wherein, when the hitch receiver insert is secured in the hitch receiver and the lifting mechanism is activated, the platform assembly is moved over a course of travel from a lowered, platform-loading position to a raised, vehicle-loading position, the upper load-bearing surface of the platform assembly being maintained in a substantially horizontal orientation, with respect to the vehicle, over a majority portion of the course of travel, via the first and the second offsets.

11. A lift for attachment to a vehicle with a hitch receiver, the lift comprising:

a hitch assembly including a hitch receiver insert;

a first support member including a first upper section and a first lower section, wherein the first upper section is rotatably mounted to the hitch assembly at a first mounting location and a portion of the first upper section is oriented at an angle with respect to a portion of the first lower section;

a second support member including a second upper section and a second lower section, wherein the second upper section is rotatably mounted to the hitch assembly at a second mounting location separated from the first mounting section by a first offset and a portion of the second upper section is oriented at an angle with respect to a portion of the second lower section;

a lifting mechanism mounted to the hitch assembly and having a load bearing connection to the first support member, whereby when activated the lifting mechanism transmits lifting force to the first support member;

a platform assembly including an upper load-bearing surface with a front edge, wherein the first lower section of the first support member is rotatably mounted to a third mounting location on a lower portion of the platform assembly and the second lower section of the second support member is rotatably mounted to a fourth mounting location on the lower portion of the platform assembly, the third mounting location being separated from the fourth mounting location by a second offset equal to the first offset; and a rear stabilizer rigidly mounted to one or more of the first lower section of the first support member, the second lower section of the second support member, and a location on the platform assembly that is rearward of at least one of the third and fourth mounting locations;

wherein, when the hitch receiver insert is secured in the hitch receiver and the lifting mechanism is activated, the platform assembly is moved over a course of travel from a lowered, platform-loading position to a raised, vehicle-loading position, with the upper load-bearing surface of the platform assembly being maintained in a substantially horizontal orientation, with respect to the vehicle, over a majority portion of the course of travel, via the first and the second offsets;

wherein, as the platform assembly approaches the vehicle-loading position from the platform-loading position, the rear stabilizer one or more of:

if mounted to one or more of the first lower section of the first support member and the second lower section of the second support member, contacts the lower portion of the platform assembly rearward of at least one of the third and fourth mounting locations; and if mounted to the platform assembly, contacts one or more of the first lower section of the first support member and the second lower section of the second support member; and wherein, the contact of the rear stabilizer with the one or more of the first lower section of the first support member, the second lower section of the second support member, and the lower portion of the platform assembly causes at least part of the upper load-bearing surface of the platform assembly to tilt downward, from a back-to-front perspective.

12. The lift of claim 11, wherein over the course of travel the front edge of the upper load-bearing surface moves from a first position that is rearward of the lifting mechanism, with respect to the vehicle, to a second position that is forward of the lifting mechanism, with respect to the vehicle.

13. The lift of claim 11, wherein the load bearing connection between the lifting mechanism and the first support member includes one or more of a cable and a strap; and wherein the lifting force is transmitted from the lifting mechanism to the first support member via one or more pulley arrangements.

14. The lift of claim 11, wherein the hitch assembly includes one or more of a shim and an offset spacer, the one or more of the shim and the offset spacer providing a spacing between the hitch receiver insert of the hitch assembly and an interior wall of the hitch receiver of the vehicle.

15. The lift of claim 11, wherein the upper load-bearing surface of the platform assembly is rotatably mounted to the platform assembly.

16. The lift of claim 15, wherein the vehicle includes a cargo bed with a removable gate;

wherein the gate is removed from the vehicle for operation of the lift; and wherein at the vehicle-loading position the upper load-bearing surface of the platform assembly rotates away from the platform assembly to serve as a replacement gate for the cargo bed.

17. The lift of claim 11, wherein the platform assembly includes one or more base supports, the one or more base supports extending below the third and the fourth mounting locations and supporting the weight of the lift, at least in part, when the platform assembly is in the platform-loading position.

18. The lift of claim 10, further comprising:
one or more of:
   a forward stabilizer rigidly mounted to one or more of the first lower section of the first support member, the second lower section of the second support member, and a location on the platform assembly that is forward of at least one of the third and fourth mounting locations; and
   a rear stabilizer rigidly mounted to one or more of the first lower section of the first support member, the second lower section of the second support member, and a location on the platform assembly that is rearward of at least one of the third and fourth mounting locations;
wherein, as the platform assembly approaches the platform-loading position from the vehicle-loading position, the forward stabilizer causes at least part of the upper load-bearing surface of the platform assembly to tilt upward, from a back-to-front perspective; and;
wherein, as the as the platform assembly approaches the vehicle-loading position from the platform-loading position, the rear stabilizer causes at least part of the upper load-bearing surface of the platform assembly to tilt downward, from a back-to-front perspective.

19. The lift of claim 10, wherein over the course of travel the front edge of the upper load-bearing surface moves from a first position that is rearward of the lifting mechanism, with respect to the vehicle, to a second position that is forward of the lifting mechanism, with respect to the vehicle.

20. The lift of claim 10, the vehicle includes a cargo bed with a removable gate;
wherein the gate is removed from the vehicle for operation of the lift; and
wherein at the vehicle-loading position the upper load-bearing surface of the platform assembly rotates away from the platform assembly to serve as a replacement gate for the cargo bed.

* * * * *